(12) United States Patent
Hoffman

(10) Patent No.: US 11,292,623 B2
(45) Date of Patent: Apr. 5, 2022

(54) METHODS AND SYSTEMS FOR AUTOMATED PHARMACEUTICAL CONTAINER SORTING

(71) Applicant: Express Scripts Strategic Development, Inc., St. Louis, MO (US)

(72) Inventor: Robert E. Hoffman, Linden, IN (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 367 days.

(21) Appl. No.: 16/423,752

(22) Filed: May 28, 2019

(65) Prior Publication Data
US 2019/0367196 A1 Dec. 5, 2019

Related U.S. Application Data

(60) Provisional application No. 62/677,213, filed on May 29, 2018.

(51) Int. Cl.
| | | |
|---|---|---|
| *B07C 5/02* | (2006.01) | |
| *B65B 5/10* | (2006.01) | |
| *G07F 17/00* | (2006.01) | |
| *B07C 5/36* | (2006.01) | |
| *B65D 83/04* | (2006.01) | |
| *B07C 5/34* | (2006.01) | |
| *B65G 1/137* | (2006.01) | |

(52) U.S. Cl.
CPC ............... *B65B 5/103* (2013.01); *B07C 5/02* (2013.01); *B07C 5/36* (2013.01); *G07F 17/0092* (2013.01); *B07C 5/34* (2013.01); *B65D 83/0409* (2013.01); *B65G 1/1376* (2013.01)

(58) Field of Classification Search
CPC .. B65B 5/103; B07C 5/02; B07C 5/36; B07C 5/34; G07F 17/0092; B65D 83/0409; B65G 1/1376
See application file for complete search history.

(56) References Cited

U.S. PATENT DOCUMENTS

| | | | | |
|---|---|---|---|---|
| 5,720,154 | A * | 2/1998 | Lasher | G16H 20/13 |
| | | | | 53/411 |
| 5,771,657 | A * | 6/1998 | Lasher | B65B 61/20 |
| | | | | 53/55 |
| 6,892,512 | B2 * | 5/2005 | Rice | G16H 70/40 |
| | | | | 53/445 |
| 7,765,776 | B1 | 8/2010 | Leu et al. | |
| 8,109,066 | B2 | 2/2012 | Leu et al. | |
| 8,423,178 | B2 * | 4/2013 | Baumann | B65G 1/1378 |
| | | | | 700/217 |

(Continued)

*Primary Examiner* — Patrick H Mackey

(57) ABSTRACT

A pharmaceutical order filling system includes an order processing device, an automated dispensing device in communication with the order processing device for dispensing a pharmaceutical into a container. The system includes pallets for transporting containers and a container sorting device in communication with the order processing device, the container sorting device for transferring the containers from the pallets to distribution areas. The container sorting device includes a pallet unloading area for retaining a pallet in a pallet unloading position, an exception conveyor, a standard order conveyor, and a container manipulation device including a gripper assembly for moving containers in order from pallets to the exception conveyor or the standard order conveyor.

23 Claims, 18 Drawing Sheets

(56) References Cited

U.S. PATENT DOCUMENTS

| | | |
|---|---|---|
| 8,731,711 B1 | 5/2014 | Joplin et al. |
| 9,221,271 B2 | 12/2015 | Eller et al. |
| 9,242,751 B1 | 1/2016 | Joplin et al. |
| 9,639,668 B2 | 5/2017 | Joplin |
| 9,710,866 B2 * | 7/2017 | Luciano, Jr ............ G16H 20/10 |
| 9,937,100 B1 | 4/2018 | Joplin et al. |
| 10,086,974 B2 | 10/2018 | Joplin |
| 10,179,699 B1 * | 1/2019 | Roper .................. B65G 1/1371 |
| 10,669,098 B1 * | 6/2020 | Terzini .................... G07F 9/002 |
| 2007/0280814 A1 * | 12/2007 | Morency .............. B65G 1/1378 |
| | | 414/788 |
| 2016/0023790 A1 * | 1/2016 | Joplin .................... B65B 57/14 |
| | | 198/340 |

\* cited by examiner

METHODS AND SYSTEMS FOR AUTOMATED PHARMACEUTICAL CONTAINER SORTING

CROSS REFERENCE TO RELATED APPLICATION

This application claims priority to U.S. Provisional Application Ser. No. 62/677,213, which was filed May 29, 2018, and which is hereby incorporated by reference in its entirety.

FIELD

The present disclosure relates generally to the technical field of pharmacy order processing, and more particularly, to methods and systems for transferring pharmaceutical-containing containers associated with a prescription order from a pallet to a container disposition area based on the associated prescription order, especially in a high volume, specialty, or partially-automated order processing center.

BACKGROUND

A high-volume pharmacy may process and fill a large number of prescriptions and prescription orders. Automated systems may be used by a high volume pharmacy to process and fulfill prescriptions. Frequently, more than one prescription drug container is required to complete a prescription order. Portions of the prescription order may be fulfilled in different areas of the high-volume pharmacy. After fulfillment, the fulfilled prescriptions may be gathered into a complete prescription order for shipping. Joining, or marrying, containers containing each type of prescription drug that make up a single prescription order may be done prior to packing and shipping and at different locations in the pharmacy, some of which may have varying levels of controlled access. Improved methods and systems for fully automated sorting are needed.

This section is intended to introduce the reader to various aspects of art that may be related to various aspects of the disclosure, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

SUMMARY

In one aspect, a pharmaceutical order filling system includes an order processing device to receive pharmaceutical orders. The pharmaceutical order filling system also includes an automated dispensing device in communication with the order processing device and configured to dispense a measured quantity of a pharmaceutical into at least one container of a plurality of containers. The system further includes a plurality of pallets configured to transport the plurality of containers and a container sorting device in communication with the order processing device, the container sorting device configured to transfer the plurality of containers containing the pharmaceuticals from the plurality of pallets to at least one of a plurality of distribution areas. The container sorting device includes a pallet unloading area sized to retain at least one pallet of the plurality of pallets in a pallet unloading position, at least one exception conveyor, at least one standard order conveyor, and a container manipulation device including a gripper assembly for moving at least one of the plurality of containers from at least one of the plurality of pallets to one of the at least one exception conveyor and the at least one standard order conveyor. A first order of the pharmaceutical order includes a first container and a second container of the plurality of containers. The container manipulation device moves the first container to the at least one standard order conveyor and then moves the second container to the at least one standard order conveyor with the first container and the second container being sequential on a same one of the at least one standard order conveyor and is non-sequential on the at least one of the plurality of pallets. The system also includes a pallet assembly in communication with the order processing device, the pallet assembly including a pallet movement apparatus configured to move the plurality of pallets between at least the automated dispensing device and the container sorting device.

In another aspect, a container sorting device is configured to transfer at least one container containing a pharmaceutical associated with a pharmaceutical order from a pallet containing the at least one container to at least one conveyor based on the pharmaceutical order. The container sorting device includes a pallet unloading area sized to retain at least one pallet in a pallet unloading position, a sensor bracket configured to retain a sensor for determining a status of the at least one pallet and a puck stop rail assembly extending at least partially around the pallet unloading area. The puck stop rail assembly is configured to at least partially constrain movement of the at least one pallet in the pallet unloading position during operation of the container sorting device. The container sorting device also includes at least one exception conveyor, at least one standard order conveyor; and a container manipulation device including a movement apparatus and a gripper assembly for moving the at least one container from the at least one pallet to one of the at least one exception conveyor and the at least one standard order conveyor. The gripper assembly includes at least one gripper head configured to grip and release the at least one container. The at least one gripper head is one of biased open and biased closed, and the at least one gripper head is independently and pneumatically actuated and is adapted to grip and to release the at least one container. The at least one gripper head includes at least one pair of gripper jaws, at least a portion of the at least one pair of gripper jaws including a friction-enhanced surface configured to increase a coefficient of friction between the at least one container and the at least one pair of gripper jaws, at least one gripper head arm coupled between the movement apparatus and the gripper head, and a pallet lift configured to manipulate the at least one pallet in the pallet unloading position in cooperation with the container manipulation device.

In still another aspect, a method of sorting a plurality of containers containing a plurality of pharmaceuticals associated with a plurality of pharmaceutical orders includes receiving, at a pallet unloading position of a container sorting device, a first pallet of a plurality of the pallets. The pallet includes a plurality of the containers containing the plurality of pharmaceuticals associated with a plurality of pharmaceutical orders. The method also includes determining a location of at least one container of the plurality of containers associated with a first pharmaceutical order in the pallet and retrieving, using a container manipulation device, the at least one container associated with the first pharmaceutical order from the pallet. The method further includes determining, based on the first pharmaceutical order, a conveyor of at least one of a standard order conveyor, a first exception conveyor, and a second exception conveyor to receive the at least one container; and placing, using the container manipulation device, the at least one container on the determined conveyor for distribution downstream of the container sorting device.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Corresponding reference characters indicate corresponding parts throughout the several views of the drawings.

DETAILED DESCRIPTION

Example systems and methods for automated pharmaceutical container sorting based on associated prescription orders are described. In the following description, for purposes of explanation, numerous specific details are set forth in order to provide a thorough understanding of example embodiments. It will be evident, however, to one of ordinary skill in the art that these embodiments may be practiced without these specific details.

Generally, a prescription order is generated for a high volume pharmacy. The prescription order may include more than one prescription drug for fulfillment. Each prescription drug in a prescription order is an order component of the prescription order. Generally, the order components are pill bottles or other containers and packaging having a measured quantity of a prescription drug therein. These containers may be filled by a mostly manual process, through a semiautomatic process, or a more fully automated process. Various factors may affect the availability of filling drugs through these processes in a pharmacy, such as the schedule or controlled nature of the filling drugs. After the containers are filled, the containers associated with each prescription order are matched as part of a joining or marrying process for further packaging, processing, and shipping. A more automated and efficient process may be employed in a mail order pharmacy to sort containers filled with pharmaceuticals, that may be of multiple schedules, based on prescription orders associated with the containers to marry or join the containers to fulfill a prescription order and increase the throughput of the high volume pharmacy.

Figure 1:
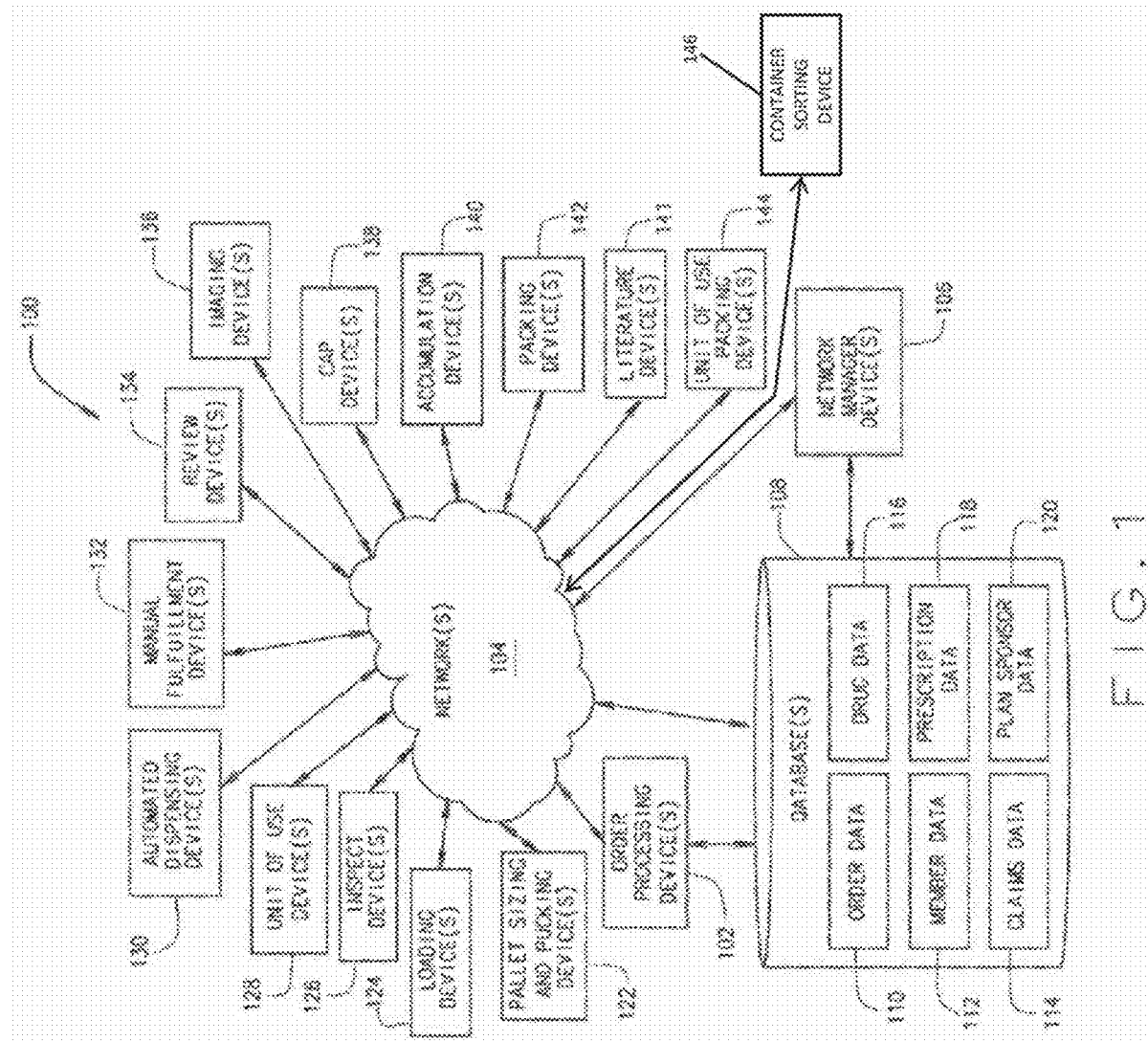
FIG. 1 is a block diagram of an example system, according to an example embodiment.

FIG. 1 is a block diagram of an example system 100, according to an example embodiment. While the system 100 is generally described as being deployed in a high volume pharmacy (e.g., a mail order pharmacy, a direct delivery pharmacy, an automated pharmacy, and the like), the system 100 may otherwise be deployed. The system 100 may include an order processing device 102 in communication with a benefit manager device 106 over a network 104. In an example embodiment, the order processing device 102 may implement functions described in U.S. Pat. Nos. 10,086,974 and 9,937,100, which are hereby incorporated by reference, to move a patient to a high volume pharmacy. Additional devices which may be in communication with the benefit manager device 106 and/or the order processing device 102 over network 104 include: database(s) 108 which may store one or more than one of order data 110, member data 112, claims data 114, drug data 116, prescription data 118, and plan sponsor data 120; pallet sizing and packing device(s) 122; loading device(s) 124; inspect device(s) 126; unit of use device(s) 128; automated dispensing device(s) 130; manual fulfillment device(s) 132; review device(s) 134; imaging device(s) 136; cap device(s) 138; accumulation device(s) 140; literature device(s) 141; packing device(s) 142; unit of use packing device(s) 144, and container sorting device(s) 146. The system 100 may also include additional devices, which may communicate with each other over network 104 or directly.

The order processing device 102 may receive information about prescriptions being filled at a pharmacy in which the order processing device 102 is deployed. In general, the order processing device 102 is a device located within or otherwise associated with a pharmacy location to enable fulfillment of a prescription by dispensing prescription drugs. In some embodiments, the order processing device 102 may be a device separate from a pharmacy that enables communication with other devices located within a pharmacy. For example, the order processing device 102 may be in communication with another order processing device 102 and/or other devices 122-146 located with a pharmacy. In some embodiments, an external pharmacy order processing device 102 may have limited functionality (e.g., as operated by a patient requesting fulfillment of a prescription drug) when an internal pharmacy order processing device 102 may have greater functionality (e.g., as operated by a pharmacy).

The order processing device 102 may track a prescription order as it is fulfilled. A prescription order may include one or more than one prescription to be filled by the pharmacy. The order processing device 102 may make pharmacy routing decisions and/or order consolidation decisions for a prescription order. The pharmacy routing decisions include what device or devices in the pharmacy are responsible for filling at least a portion of the prescription order, where the order consolidation decisions include whether portions of a prescription order or multiple prescription orders should be shipped together for a patient or a patient family. The order processing device 102 may operate on its own or in combination with the benefit manager device 106. The order processing device 102 may track and/or schedule the literature or other paperwork associated with each order or multiple prescription orders that are being shipped together.

Examples of the devices 102, 106 include a set-top box (STB), a receiver card, a mobile telephone, a personal digital assistant (PDA), a display device, a portable gaming unit, a tablet, and a computing system; however other devices may also be used. For example the devices 102, 106 may include a mobile electronic device, such an IPHONE or IPAD device by Apple, Inc. mobile electronic devices powered by ANDROID by Google, Inc. and a BLACKBERRY device by Blackberry Limited. The devices 102, 106 may also include other computing devices, such as desktop computing devices, notebook computing devices, netbook computing devices, gaming devices, and the like. The devices 102, 106 may include a processor, a memory to store data and instructions, and communication functionality. Other types of electronic devices that can use rules and instructions to execute various functions may also be used.

Examples of the network 104 include Mobile Communications (GSM) network, a code division multiple access (CDMA) network, 3rd Generation Partnership Project (3GPP), an Internet Protocol (IP) network, a Wireless Application Protocol (WAP) network, a WiFi network, or an IEEE 802.11 standards network, as well as various combinations thereof. The network 104 may include optical communications. The network 104 may be a local area network or a global communication network, such as the Internet. Other conventional and/or later developed wired and wireless networks may also be used. In some embodiments, the network 104 may include a prescribing network such as the electronic prescribing network operated by Surescripts of Arlington, Va.

The benefit manager device 106 is a device operated by an entity at least partially responsible for creation and/or management of the pharmacy or drug benefit. While this benefit manager operating the benefit manager device 106 is typically a pharmacy benefit manager (PBM), other entities may operate the benefit manager device 106 either on behalf of themselves, the PBM, or another entity. For example, the benefit manager may be operated by a health plan, a retail pharmacy chain, a drug wholesaler, a data analytics or other type of software-related company, or the like. In some embodiments, a PBM that provides the pharmacy benefit may also provide one or more than one additional benefits including a medical or health benefit, a dental benefit, a vision benefit, a wellness benefit, a radiology benefit, a pet care benefit, an insurance benefit, a long term care benefit, a nursing home benefit, and the like. The PBM may, in addition to its PBM operations, operate one or more than one pharmacy. The pharmacies may be retail pharmacies, mail order pharmacies, or otherwise.

Some of the operations of the PBM that operates the benefit manager device 106 may include the following. A member (or a person on behalf of the member) of a pharmacy benefit plan administered by or through the PBM attempts to obtain a prescription drug at a retail pharmacy location where the member can obtain drugs in a physical store from a pharmacist or pharmacist technician, or in some instances through mail order drug delivery from a mail order pharmacy location. The member may also obtain a prescription drug directly or indirectly through the use of a machine, such as a kiosk, vending unit, mobile electronic device, or a different type of mechanical, electrical, electronic communication device and/or computing device.

The member may have a co-pay for the prescription drug that reflects an amount of money that the member is responsible to pay the pharmacy for the prescription drug. The money paid by the member to the pharmacy may come from the personal funds of the member, a health savings account (HSA) of the member or the member's family, a health reimbursement arrangement (HRA) of the member or the member's family, a flexible spending accounts (FSA) of the member or the member's family, or the like. An employer of the member may directly or indirectly fund or reimburse the member or an account of the member for the co-pay.

The amount of the co-pay paid by the member may vary by the benefit plan of a plan sponsor or client with the PBM. The member's co-pay may be based on a flat co-pay (e.g., $10), co-insurance (e.g., 10%), and/or a deductible (e.g., for first $500 of annual prescription drug spend) for certain prescription drugs, certain types and/or classes of prescription drugs, and/or all prescription drugs.

In certain instances, the member may not pay the co-pay or may only pay for a portion of a co-pay for a prescription drug. For example, if the usual and customary cost for a generic version of a prescription drug is $4, and the member's flat co-pay is $20 for the prescription drug, the member may only pay $4 to receive the prescription drug. In another example involving a worker's compensation claim, no co-pay may be due by the member for the prescription drug. The co-pay may also vary based on the delivery channel used to receive the prescription drug. For example, the co-pay for receiving prescription drug from a mail order pharmacy location may be less than the co-pay for receiving prescription drug from a retail pharmacy location.

In conjunction with receiving the co-pay (if any) from the member and dispensing the prescription drug to the member, the pharmacy submits a claim to the PBM for the prescription drug. The PBM may perform certain adjudication operations including verifying the eligibility of the member, reviewing an applicable formulary of the member to determine appropriate co-pay, coinsurance, and deductible for the prescription drug, and performing a drug utilization review (DUR) on the member. The PBM then provides a response to the pharmacy following performance of at least some of the aforementioned operations. As part of the adjudication, the plan sponsor (or the PBM on behalf of the plan sponsor) ultimately reimburses the pharmacy for filling the prescription drug when the prescription drug was successfully adjudicated. The aforementioned adjudication operations generally occur before the co-pay is received and the prescription drug dispensed. However, the operations may occur simultaneously, substantially simultaneously, or in a different order. In addition, more or less adjudication operations may be performed as at least part of the adjudication process.

The amount of reimbursement paid to the pharmacy by a plan sponsor and/or money paid by the member may be based at least in part on the type of pharmacy network in which the pharmacy is included. Other factors may be used to determine the amount in addition to the type of pharmacy network. For example, if the member pays the pharmacy for the prescription without using the prescription drug benefit provided by the benefit manager, the amount of money paid by the member may be higher and the amount of money received by the pharmacy for dispensing the prescription drug and for the prescription drug itself may be higher. Some or all of the foregoing operations may be performed by executing instructions on the benefit manager device 106 and/or an additional device.

In some embodiments, at least some of the functionality of the order processing device 102 may be included in the benefit manager device 106. The order processing device 102 may be in a client-server relationship with the benefit manager device 106, a peer-to-peer relationship with the benefit manager device 106, or in a different type of relationship with the benefit manager device 106.

The order processing device 102 and/or the benefit manager device 106 may be in communication directly (e.g., through local storage or peer-to-peer connection(s)) and/or through the network 104 (e.g., in a cloud configuration or software-as-a-service) with a database 108 (e.g., as may be retained in memory or otherwise). The database 108 may be deployed on the order processing device 102, the benefit manager device 106, on another device of the system 100, or otherwise. The database 108 may store order data 110, member data 112, claims data 114, drug data 116, prescription data 118, and/or plan sponsor data 120. Other data may be stored in the database 108.

The order data 110 may include data related to the order of prescriptions including the type (e.g., drug name and strength) and quantity of each prescription in a prescription order. The order data 110 may also include data used for completion of the prescription, such as prescription materials and/or the type and/or size of container in which the drug is or is preferably dispensed. In general, prescription materials are a type of order materials that include an electronic copy of information regarding the prescription drug for inclusion with or otherwise in conjunction with the fulfilled prescription. The prescription materials may include electronic information regarding drug interaction warnings, recommended usage, possible side effects, expiration date, date of prescribing, or the like. The order data 110 may be used by a high volume fulfillment center to fulfill a pharmacy order. In some embodiments, the order data 110 includes verification information associated with fulfillment of the prescription in the pharmacy. For example, the order data 110 may include videos and/or images taken of (i) the prescription drug prior to dispensing, during dispensing, and/or after dispensing, (ii) the prescription container (e.g., a prescription bottle and sealing lid) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other type of verification information such as bar code data read from pallets used to transport prescriptions within the pharmacy may also be stored as order data 110.

The member data 112 includes information regarding the members associated with the benefit manager. The information stored as member data 112 may include personal information, personal health information, protected health information, and the like. Examples of the member data 112 include name, address, telephone number, e-mail address, prescription drug history, and the like. The member data 112 may include a plan sponsor identifier that identifies the plan sponsor associated with the member and/or a member identifier that identifies the member to the plan sponsor. The member data 112 may include a member identifier that identifies the plan sponsor associated with the patient and/or a patient identifier that identifies the patient to the plan sponsor. The member data 112 may also include, by way of example, dispensation preferences such as type of label, type of cap, message preferences, language preferences, or the like. The member data 112 may be accessed by various devices in the pharmacy, e.g., the high volume fulfillment center, to obtain information utilized for fulfillment and shipping of prescription orders. In some embodiments, an external order processing device 102 operated by or on behalf of a member may have access to at least a portion of the member data 112 for review, verification, or other purposes.

In some embodiments, the member data 112 may include information for persons who are patients of the pharmacy but are not members in a benefit plan being provided by the benefit manager. For example, these patients may obtain drug directly from the pharmacy, through a private label service offered by the pharmacy, the high volume fulfillment center, or otherwise. In general, the use of the terms member and patient may be used interchangeably herein.

The claims data 114 includes information regarding pharmacy claims adjudicated by the PBM under a drug benefit program provided by the PBM for one, or more than one, plan sponsors. In general, the claims data 114 includes an identification of the client that sponsors the drug benefit program under which the claim is made, and/or the member that purchased the prescription drug giving rise to the claim, the prescription drug that was filled by the pharmacy (e.g., the national drug code number), the dispensing date, generic indicator, GPI number, medication class, the cost of the prescription drug provided under the drug benefit program, the copay/coinsurance amount, rebate information, and/or member eligibility. Additional information may be included. In some embodiments, other types of claims beyond prescription drug claims may be stored in the claims data 114. For example, medical claims, dental claims, wellness claims, or other type of health care-related claims for members may be stored as a portion of the claims data 114.

In some embodiments, the claims data 114 includes claims that identify the members with whom the claims are associated. In some embodiments, the claims data 114 includes claims that have been de-identified (e.g., associated with a unique identifier but not with a particular, identifiable member).

The drug data 116 may include drug name (e.g., technical name and/or common name), other names by which the drug is known by, active ingredients, an image of the drug (e.g., in pill form), and the like. The drug data 116 may include information associated with a single medication or multiple medications.

The prescription data 118 may include information regarding prescriptions that may be issued by prescribers on behalf of patients, who may be members of the drug benefit plan, for example to be filled by a pharmacy. Examples of the prescription data 118 include patient names, medication or treatment (such as lab tests), dosing information, and the like. The prescriptions may be electronic prescriptions, paper prescriptions that have been scanned, or otherwise. In some embodiments, the dosing information reflects a frequency of use (e.g., once a day, twice a day, before each meal, etc.) and a duration of use (e.g., a few days, a week, a few weeks, a month, etc.).

In some embodiments, the order data 110 may be linked to associated member data, claims data 114, drug data 116, and/or prescription data 118.

The plan sponsor data 120 includes information regarding the plan sponsors of the benefit manager. Examples of the plan sponsor data 120 include company name, company address, contact name, contact telephone number, contact e-mail address, and the like.

The order processing device 102 may direct at least some of the operations of the devices 122-146, recited above. In some embodiments, operations performed by one of these devices 122-146 may be performed sequentially, or in parallel with the operations of another device as may be coordinated by the order processing device 102. In some embodiments, the order processing device 102 tracks a prescription with the pharmacy based on operations performed by one or more of the devices 122-146.

In some embodiments, the system 100 may transport prescription drug containers (e.g., between one or more than one of the devices 122-146 in the high volume fulfillment center) by use of pallets. The pallet sizing and pucking device 122 may configure pucks in a pallet. A pallet may be a transport structure for a number of prescription containers, and may include a number of cavities. A puck may be placed in one or more than one of the cavities in a pallet by the pallet sizing and pucking device 122. A puck may include a receptacle sized and shaped to receive a prescription container. Such containers may be supported by the pucks during carriage in the pallet and during movement through the fulfillment process. Different pucks may have differently sized and shaped receptacles to accommodate containers of differing sizes, as may be appropriate for different prescriptions. Pucks allow the standardization of equipment engaging differently sized drug containers such that some automated equipment can move the drug container by gripping the puck that is supporting the container and allow the use of a standardized pallet that holds a plurality of pucks have a same outer dimension while having differently sized receptacles therein to hold differently sized drug containers. The pucks may also operate to ensure that a drug container is centered in a location on the pallet.

The arrangement of pucks in a pallet may be determined by the order processing device 102 based on prescriptions which the order processing device 102 decides to launch. In general, prescription orders in the order database 110 reside in one or more than one queues, and are generally launched in a first-in-first-out order. However, the order processing device 102 may use logic and a variety of factors to determine when and how prescriptions are to be launched. For example, some non-limiting factors which may alter the first-in-first-out order of launching prescriptions in a pharmacy include the age of the order, whether the order required an outreach to a physician or some other intervention, whether there are any performance guarantees with plan sponsors or members, the available inventory of a given pharmaceutical in view of existing prescriptions already launched which will require that pharmaceutical, the zip code to which the order will be shipped, the workload and volume of various parts of the pharmacy, whether valid paperwork for the order has been received, and/or similar orders for the same pharmaceutical that are already to be launched. The logic may be implemented directly in the pallet sizing and pucking device 122, in the order processing device 102, in both devices 102, 122, or otherwise. Once a prescription is set to be launched, a puck suitable for the appropriate size of container for that prescription may be positioned in a pallet by a robotic arm or pickers. The pallet sizing and pucking device 122 may launch a pallet once pucks have been configured in the pallet. The loading device 124 may load prescription containers into the pucks on a pallet by a robotic arm, pick and place mechanism, or the like. In one embodiment, the loading device 108 has robotic arms or pickers to grasp a prescription container and move it to and from a pallet. The loading device 124 may also print a label which is appropriate for a container that is to be loaded onto the pallet, and apply the label to the container. The pallet may be located on a conveyor assembly during these operations. In an example embodiment, the drug containers may be positioned in the pucks by the loading device 124 prior to the pucks being placed in the pallet. The inspect device 126 may verify that containers in a pallet are correctly labeled and in the correct spot on the pallet. The inspect device 126 may scan the label on one or more than one container on the pallet. Labels of containers may be scanned or imaged in full or in part by the inspect device 126. Such imaging may occur after the container has been lifted out of its puck by a robotic arm, picker, or the like, or may be otherwise scanned or imaged while retained in the puck. In some embodiments, images and/or video captured by the inspect device 126 may be stored in the database 108 as order data 110.

The unit of use device 128 may temporarily store, monitor, label and/or dispense unit of use products. In general, unit of use products are prescription drug products that may be delivered to a patient or member without being repackaged at the pharmacy. These products may include pills in container, pills in a blister pack, inhalers, and the like. Pills to be placed in a container may include, and not be limited to, capsules, tablets, caplets, lozenges, and other solid medium with a pharmaceutical component that may be ingested by a person or other mammal. Prescription drug products dispensed by the unit of use device 128 may be packaged individually or collectively for shipping, or may be shipped in combination with other prescription drugs dispensed by other devices in the high volume fulfillment center.

The automated dispensing device 130 may include one or more than one devices that dispense prescription drugs or pharmaceuticals into prescription containers in accordance with one or multiple prescription orders. In general, the automated dispensing device 130 may include mechanical and electronic components with, in some embodiments, software and/or logic to facilitate pharmaceutical dispensing that would otherwise be performed in a manual fashion by a pharmacist and/or pharmacist technician. For example, the automated dispensing device 130 may include high volume fillers that fill a number of prescription drug types at a rapid rate and blister pack machines that dispense and pack drugs into a blister pack or other pre-packaged form of pills. Prescription drugs dispensed by the automated dispensing devices 130 may be packaged individually or collectively for shipping, or may be shipped in combination with other prescription drugs dispenses by other devices in the high volume fulfillment center.

The automated dispensing device 130 may be used, for example, to dispense commonly prescribed dispense drugs in an automatic or semiautomatic method into containers. Drugs may be dispensed in connection with filling one or more than one prescriptions (or portions of prescriptions). Drugs dispensed by the automated dispensing device 130 may be tablets, pills, capsules, caplets, or other types of drugs suitable for dispensing by a the automated dispensing device 130.

The manual fulfillment device 132 may provide for manual fulfillment of prescriptions. For example, the manual fulfillment device 132 may receive or obtain a container and enable fulfillment of the container by a pharmacist or pharmacy technician. In some embodiments, the manual fulfillment device 132 provides the filled container to another device in the system 100. In an example embodiment, the container may be joined with other containers in a prescription order for a patient or member, e.g., on a pallet or at the accumulation device 140. In general, a manual, fulfillment may include operations at least partially performed by a pharmacist or pharmacy technician. For example, a person may retrieve a supply of the prescribed drug, may make an observation, may count out a prescribed quantity of drugs and place them into a prescription container, or the like. Some portions of the manual fulfillment process may be automated by use of a machine. For example, counting of capsules, tablets, or pills may be at least partially automated (e.g., through use of a pill counter). Prescription drugs dispensed by the manual fulfillment device 132 may be packaged individually or collectively for shipping, or may be shipped in combination with other prescription drugs dispenses by other devices in the high volume fulfillment center.

The review device 134 may process prescription containers to be reviewed by a pharmacist for proper pill count, exception handling, prescription verification, and the like. Fulfilled prescriptions may be manually reviewed and/or verified by a pharmacist, as may be required by state or local law. A pharmacist or other licensed pharmacy person who may dispense certain drugs in compliance with local and/or other laws may operate the review device 134 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been cancelled, containers with defects, and the like. In an example embodiment, the manual review can be performed at the manual station.

The imaging device 136 may image containers after they have been filled with pharmaceuticals. The imaging device 136 may measure the fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 102, and/or stored in the database 110 as part of the order data 110.

The cap device 138 may be used to cap or otherwise seal a prescription container. In some embodiments, the cap device 138 may secure a prescription container with a type of cap in accordance with a patient preference (e.g., a preference regarding child resistance), a plan sponsor preference, a prescriber preference, or the like. The cap device 138 may also print or etch a message into the cap or otherwise associate a message into the cap, although this process may be performed by a subsequent device in the high volume fulfillment center. Etching may be suitably performed according to the teachings in U.S. patent application Ser. No. 14/313,042, granted as U.S. Pat. No. 9,221,271, which are both hereby incorporated by reference.

The accumulation device 140 accumulates various containers of prescription drugs in a prescription order. The accumulation device 140 may accumulate prescription containers from various devices or areas of the pharmacy. For example, the accumulation device 140 may accumulate prescription containers from the unit of use device 128, the automated dispensing device 130, the manual fulfillment device 132, and the review device 134, at the high volume fulfillment center. The accumulation device 140 may be used to group the prescription containers prior to shipment to the member or otherwise. In some embodiments, the literature device 141 folds or otherwise prepares the literature for inclusion with a prescription drug order (e.g., in a shipping container). In some embodiments, the literature device 141 that prints the literature may be separate from the literature device that prepares the literature for inclusion with a prescription order.

The packing device 142 packages a prescription order in preparation for shipping the order. The packing device 142 may box, bag, or otherwise package the fulfilled prescription order for delivery. The packing device 142 may further place inserts, e.g., literature or other papers into the packaging received from the literature device 141 or otherwise. For example, bulk prescription orders may be shipped in a box, while other prescription orders may be shipped in a bag which may be a wrap seal bag. The packing device 142 may label the box or bag with the address and a recipient's name. The label may be printed and affixed to the bag or box, be printed directly onto the bag or box, or otherwise associated with the bag or box. The packing device 142 may sort the box or bag for mailing in an efficient manner (e.g., sort by delivery address). The packing device 142 may include ice or temperature sensitive elements for prescriptions which are to be kept within a temperature range during shipping in order to retain efficacy or otherwise. The ultimate package may then be shipped through postal mail, through a mail order delivery service that ships via group and/or air (e.g., UPS, FEDEX, or DHL), through delivery service, through a local delivery service (e.g., a courier service), through a locker box at a shipping site (e.g., an AMAZON locker or a post office box), or otherwise.

The unit of use packing device 144 packages a unit of use prescription order in preparation for shipping the order. The unit of use packing device 144 may include manual scanning of containers to be bagged for shipping to verify each container in the order. In an example embodiment, the manual scanning may be performed at a manual station.

The container sorting device 146 may include one or more device that transfers prescription containers containing prescription drugs or pharmaceuticals associated with multiple prescription orders from pucks within a pallet to one of multiple material handling devices that will distribute the containers to their predetermined downstream pharmacy areas. In general, the container sorting device 146 may include mechanical and electronic components with, in some embodiments, software and/or logic to facilitate pharmaceutical order sorting that would otherwise be performed in a manual and/or less efficient fashion by another machine, a pharmacist, and/or a pharmacist technician. For example, the container sorting device may include a container manipulation device that transfers a single container of a pharmaceutical order from a pallet to one of a standard conveyor and an exception conveyor. In another example, the container sorting device 146 may transfer multiple containers. Containers moved from the pallet to the standard conveyor may be transferred to devices within the high volume fulfillment center for further inspection or packing, and containers moved from the pallet to the exception conveyor may be held for further inspection or appropriate action based on the level of control associated with the containers.

The container sorting device 146 may be used, for example, to sort commonly prescribed and non-controlled drugs from the pallet onto the standard conveyor as part of a single or multiple container order for further processing by downstream devices in the high volume fulfillment center. Prescription orders including controlled substances (such as those in controlled access area 503 described below) may be sorted from the pallet to the exception conveyor as part of a single or multiple container prescription order by the container sorting device 146 for further inspection and/or disposition by pharmacist or pharmacy technician.

While the system 100 in FIG. 1 is shown to include single devices 102, 106, 122-146 multiple devices may be used. The devices 102, 106, 122-146 may be the same type or model of device or may be different device types or models. When multiple devices are present, the multiple devices may be of the same device type or models or may be a different device type or model. The types of devices 102, 106, 122-146 shown in FIG. 1 are example devices. In other configurations of the system 100, lesser, additional, or different types of devices may be included.

Moreover, the system 100 shows a single network 104; however, multiple networks can be used. The multiple networks may communicate in series with each other to link the devices 102, 106, 122-146 or in parallel to link the devices 102, 106, 122-146. Multiple devices may share processing and/or memory resources. The devices 102, 106, 122-146 may be located in the same area or in different locations. For example, the devices 102, 106, 122-146 may be located in a building or set of adjoining buildings. The devices 102, 106, 122-146 may be interconnected (e.g. by conveyors), networked, and/or otherwise in contact with one another or integrated with one another e.g., at the high volume fulfillment center. In addition, the functionality of a device may be split among a number of discrete devices and/or combined with other devices.

The system 100 may include a single database, or multiple databases, maintained by respective devices operated by or on behalf of one or a number of different persons and/or organizations. The communication may occur directly (e.g., through local storage) and/or through the network 104 (e.g., in a cloud configuration or software-as-a-service) with a device that stores a respective database.

Figure 2:
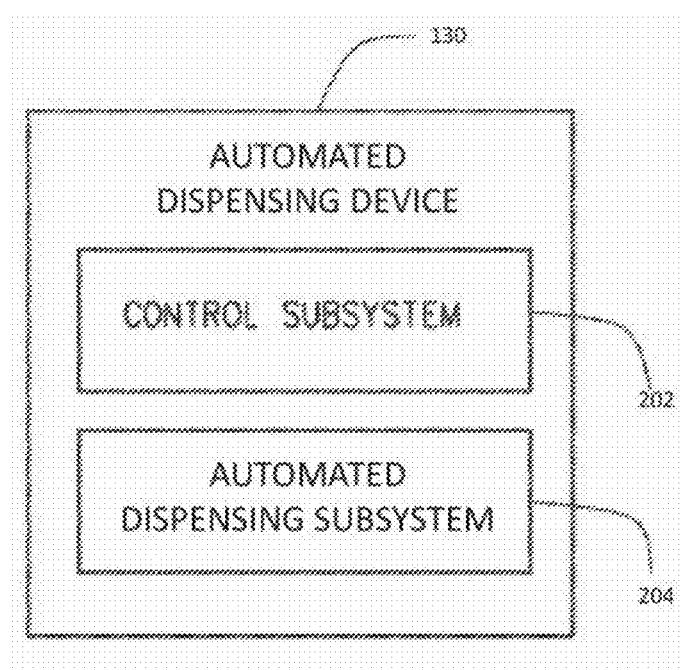
FIG. 2 is a block diagram of an example automated dispensing device that may be deployed within the system of FIG. 1, according to an example embodiment.

FIG. 2 illustrates an automated dispensing device 130, according to an example embodiment. The automated dispensing device 130 may be deployed in the system 100 of FIG. 1, or may otherwise be used. The automated dispensing device 130 may include a control subsystem 202 and an automated dispensing subsystem 204. The control subsystem 202 may include one or more module and enables the automated dispensing device 130 to control the automated dispensing subsystem 204, while the automated dispensing subsystem 204 may include one or more device and enables the automated dispensing device 130 with dispensing operations (e.g., dispensing a measured quantity pharmaceuticals into a container).

An example deployment of the automated dispensing device 130 is within the system 100. In such a deployment, the system 100 includes one or more than one conveyor or other devices to facilitate transporting containers or pallets of containers through mechanical devices within the system 100, such as devices to label, fill, cap, and check containers. The automated dispensing device 130 may be otherwise deployed.

Figure 3:
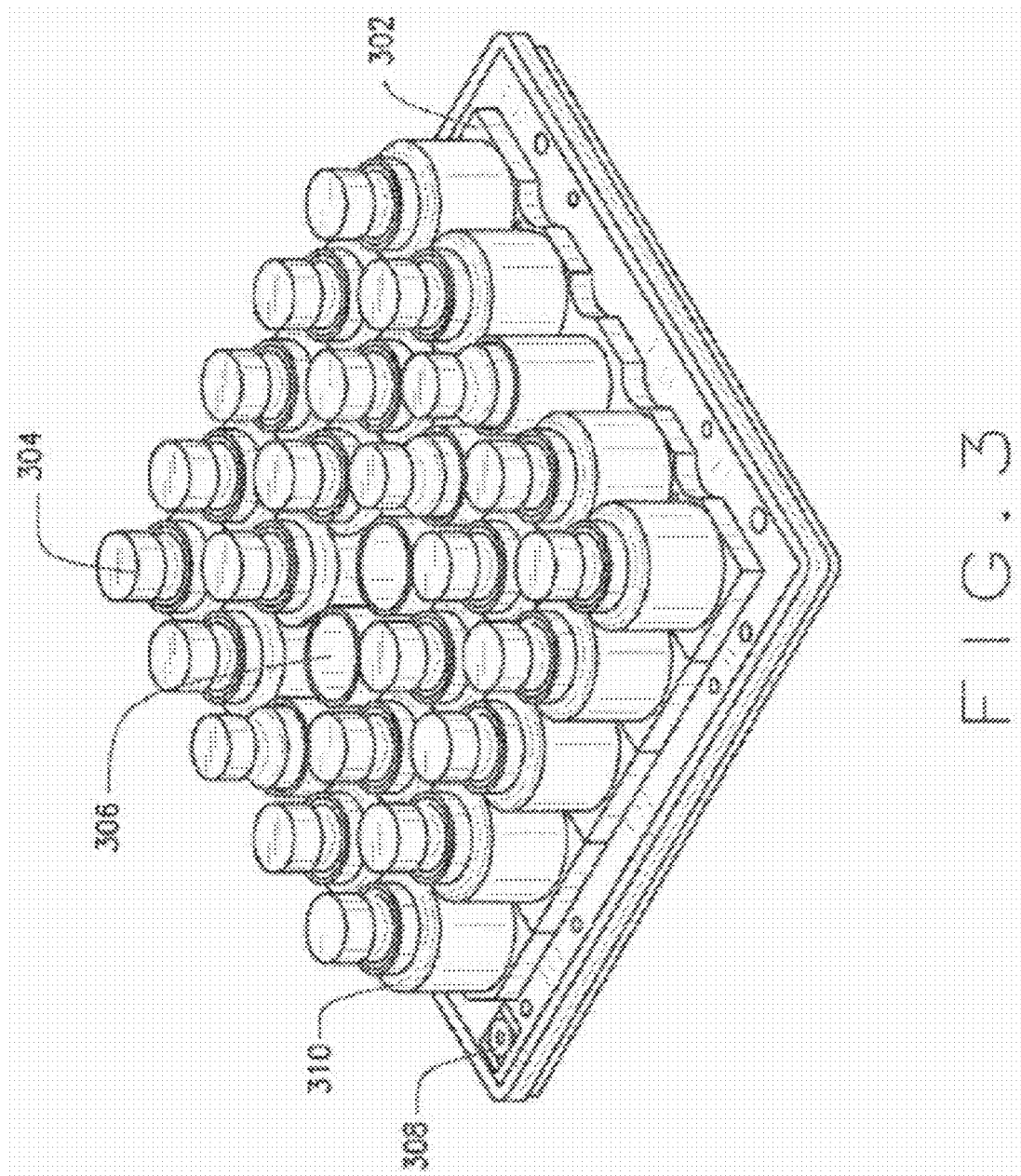
FIG. 3 is a top, perspective view of a pallet that may be deployed within the system of FIG. 1, according to an example embodiment.

FIG. 3 illustrates a pallet 302, according to an example embodiment. The pallet 302 may be used in the system 100 of FIG. 1 (e.g., by the automated dispensing device 130), or may be otherwise used.

The pallet 302 may be a transport structure for a number of prescription containers 304, and may include a number of cavities 306. While the pallet 302 is shown to include 25 cavities in a five by five cavity row/column configuration, other numbers of categories and/or cavity configurations of varying shapes, size, and/or dimensions may be used. In some embodiments the pallet may be substantially square and, in such an embodiment, have a width and length of between approximately 18 inches and 22 inches (e.g., approximately 18 inches, 19 inches, 20 inches, 21 inches, or 22 inches). In some embodiments, the width and/or length may be greater than approximately 22 inches or less than approximately 18 inches.

In an example embodiment, the cavities 306 are spaced on the pallet 302 such that the center point of adjacent cavities 306 is between approximately 3 inches and 4 inches (e.g., approximately 3 inches, 3.25 inches, 3.5 inches, 3.75 inches or 4 inches). In another example embodiment, the distance between center points of adjacent cavities 306 is more than approximately 4 inches. In yet another example embodiment, the center points of cavities 306 are less than approximately 3 inches apart.

The pallet 302 may be made in whole or in part of metal, such as aluminum. Other suitable materials may be used for the pallet 302, such as plastic. The pallet 302 may be rigid so that the cavities remain in a known location that can be tracked while the pallet moves through the system 100. The pallet 302 may include bumpers.

In some embodiments, other carriers beyond the pallet 302 and/or no carrier may be used to move containers or groups of containers through the system 100 or via the automated dispensing subsystem 204.

The pallet 302 may retain one or more than one containers 304. A container 304 is generally cylindrical and may be of one or a variety of sizes utilized by a pharmacy for fulfillment of a prescription. For example, a pharmacy may have two different sized containers or three different sized containers. Any number of different sized containers may be used with the pallet 302. While the container 304 is generally denoted as being used with the pallet 302, the containers 304 may otherwise be used in the system 100 or in a different system. Shapes beyond cylindrical shapes may be used for the containers 304. Examples of other shapes include regular prisms, elliptical cylinders, and combinations thereof. The receptacle of a puck may be sized to receive and support the outer shape of the container. The containers 304 may be disposed in the pallet 302 such that they are close to one another but do not touch.

The pallet 302 may include a radio-frequency identification (RFID) tag 308. The RFID tag 308 may be an active RFID tag, such as an active RFID tag with a close reading range. In some embodiments, the RFID tag 308 is an active, narrowband, read/write RFID tag.

The RFID tag 308 of a particular pallet 302 may store data (or otherwise facilitate the access of data, e.g., from the database 108) associated with the containers 304 that have been, are, and/or will be placed within the pallet 302, such as the order data 110, the member data 112, the claims data 114, the drug data 116, the prescription data 118, and/or the plan sponsor data 120 associated with such containers 304. Other data may be stored by and/or or associated with the RFID tag 314, such as the age of the pallet 302, the number of times the pallet 302 has been used to transport containers 304 through the system 100, the number of errors associated with the pallet 302, and the like. The RFID tag 314 may also store the position of individual containers on the pallet 302. In an example embodiment, the RFID tag 308 of the pallet 302, while deployed within an automated dispensing subsystem 204, stores data associated with one or more of the following data fields: (1) container identifiers, (2) identifier of the particular automated dispensing subsystem 204, (3) identifiers of the particular cells from which a particular container will be filled (as described below), (4) container properties (e.g., the status of containers 304 on the pallet 302, such as whether the containers 304 have passed an inspection station and have been identified as containers 304 to be filled in the particular automated dispensing subsystem 204), and (5) the pallet route within the automated dispensing subsystem 204.

The pucks 310 may be used to modify the size of the cavities 306 to allow the pallet 302 to accommodate different sizes of the containers 304.

Figure 4:
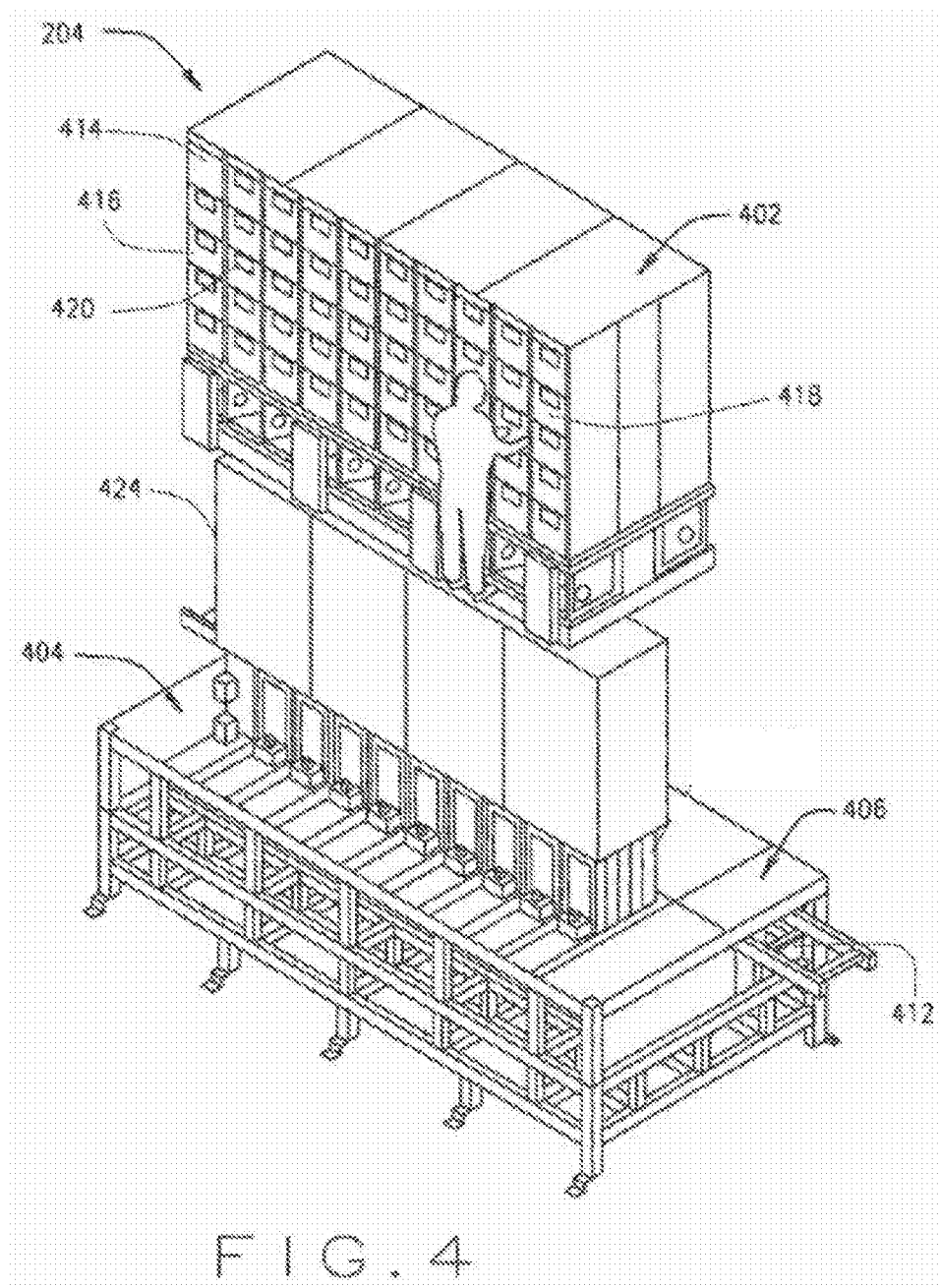
FIG. 4 is a perspective view of an automated dispensing subsystem that may be deployed within the automated dispensing device of FIG. 2, according to an example embodiment.
Figure 5:
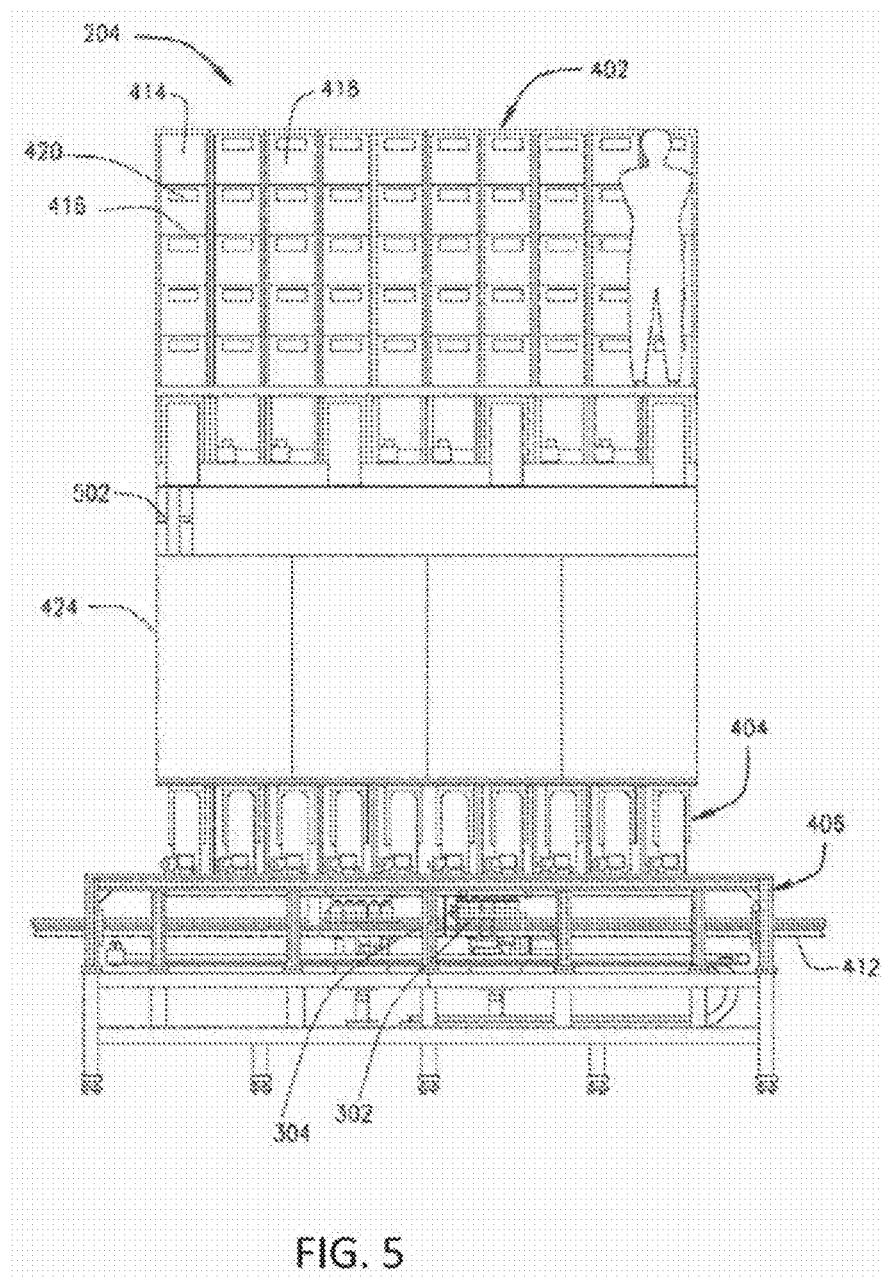
FIG. 5 is a front view of the automated dispensing subsystem of FIG. 4.

FIGS. 4-5 illustrate the automated dispensing subsystem 204, according to an example embodiment. The automated dispensing subsystem 204 may be deployed within the automated dispensing device 130, or may otherwise be deployed. The automated dispensing subsystem 204 enables dispensing of a number of different types of pharmaceuticals in an automatic or semiautomatic manner.

The automated dispensing subsystem 204 includes a filling cabinet 402, a prefill assembly 404, and a pallet assembly 406. The filling cabinet 402 stores pharmaceuticals to be dispensed into containers via the prefill assembly 404 and dispenses measured quantities of pharmaceuticals into the prefill assembly 404. The prefill assembly 404 stores the measured quantities of pharmaceuticals and dispenses the measured quantities of pharmaceuticals received from the filling cabinet 402 into containers 304 on the pallet 302 while in the pallet assembly 406.

A pallet conveyor 412 may transport the pallets 302 through some or all of the devices within the system 100, such as the automated dispensing device 130. The pallet assembly 406 receives the pallets 302 via the pallet conveyor 412 and moves the pallets 302 within the pallet assembly 406 such that pharmaceuticals dispensed by the automated dispensing subsystem 204 are dispensed into the containers 304 on the pallet 302.

The pallet conveyor 412 may be a chain conveyor or a belt driven conveyor, e.g., a belted Bosch TS2 belt-driven conveyor; other types of conveyors may be used for the pallet conveyor 412, such as a chain conveyor. In some embodiments, the pallet conveyor 412 is a low friction, high speed conveyor.

Although pallets are generally described herein as employed to move a group of containers through the system 100 or within the automated dispensing subsystem 204, trays or other types of carriers may be employed to move a group of containers 304 through the system 100 or within the automated dispensing subsystem 204.

The filling cabinet 402 may be physically housed, located, positioned or installed above the prefill assembly 404 and the pallet assembly 406. For example, the filling cabinet 402 may be located on a first floor (e.g., in a building) and the prefill assembly 404 and the pallet assembly 406 may be located on a second floor (e.g., in the same building) below the filling cabinet 402. These components of the automated dispensing subsystem 204 may be otherwise positioned, e.g., in a position to use gravity to move pharmaceuticals from the filling cabinet 402 to the prefill assembly 404 and then to the containers on 304 the pallet 302. For example, some portion of the filling cabinet 402 may extend below the first floor.

The filling cabinet 402 may include multiple cells 414. The cells 414 may each be adapted to hold a different pharmaceutical. The cells 414 may be adapted to receive inserts 416. For example, the inserts 416 may be slidably inserted into the cells 414. The inserts 416 may be adapted to hold pharmaceuticals to be dispensed into the containers 304 via the automated dispensing subsystem 204. The cells 414 may receive pharmaceuticals, retain such pharmaceuticals, and dispense measured quantities of such pharmaceuticals into the prefill assembly 404. The insert 416 may be adapted to be removably received within the cell 414. For example, the insert 416 may pull out of the cell 414 like a drawer or a fixable pouch. In some embodiments, the cells 414 and the inserts 416 may be provided on opposite sides of the filling cabinet 402. Thus, the first and second sides of the filling cabinet 402 may be separately accessible. The filling cabinet 402 may include fifty cells 414 per side, so in an embodiment in which cells 414 are provided on opposite sides of the filling cabinet 402, the filling cabinet 402 may include up to and including 100 cells. In other embodiments, fewer or more than 50 cells may be included per side and/or fewer or more than 100 cells may be included per filling cabinet 402. Each cell 414 may receive an insert 416 filled (or to be filled) with a different pharmaceutical or multiple cells 414 may each receive an insert 416 filled (or to be filled) with the same pharmaceutical. For example, more than one insert 416 may be filled with a commonly prescribed pharmaceutical.

The insert 416 may include a face plate 418 with a door 420. The door 420 may be adapted to lock and to unlock to be opened. For example, the door 420 may be adapted to be locked unless and until it is unlocked. The door 420 may be adapted to unlock pursuant to a process that mitigates risk of unauthorized access to the pharmaceuticals within the insert 416 and/or to mitigate risks that unintended pharmaceuticals will be added to the insert 416. In an example embodiment, the door 420 of the cell 414 will unlock when identifying information associated with a pharmaceutical container is detected (e.g., by a pharmacist using a hand-held scanning device to read a bar code or other computer-readable element on the pharmaceutical container) that matches identifying information associated with the cell 414 (e.g., by a pharmacist using a hand-held scanning device to read a bar code or other computer-readable element on the face plate 418 of the insert 416) and information about the pharmacist who fills the cell 414 (e.g., by a pharmacist using a hand-held scanning device to read a bar code or other computer-readable element on the pharmacist's badge). The inserts 416 may be otherwise accessed to receive pharmaceuticals to be held and dispensed.

The cell 414 may be adapted to receive a funnel (not shown). A first portion of the funnel disposed within the cell 414 may be adapted to receive a dispensing tube (not shown) of the insert 416, through which pharmaceuticals may be dispensed from the insert 416 into the funnel. This may be through the large opening in the funnel. A second portion of the funnel may exist outside of the cell 414 and be in communication with a tube connected to a rear opening of the funnel. The second portion may be the stem of the funnel, which acts as a discharge for the pharmaceuticals being dispensed.

A frame portion 424 supports multiple dispensing tubes connected to the discharge of the funnels of the filling cabinet 402. In general, however, the tubes are included to enable the cells 414 to dispense drugs. The tubes may suitably be static dissipative flex tubes and may be grounded to allow for static to flow to ground the tubes. In some embodiments, the prefill assembly 404 may include multiple buffer tubes connected to the dispensing tubes within the prefill assembly 404. The buffer tubes may be removable to, for example, facilitate cleaning or replacement. The buffer tubes may be shaped as a long-draw funnel or include a long-draw funnel. A long draw funnel may facilitate dispensing of pharmaceuticals while minimizing jams. In an example embodiment, a long draw funnel may be greater than six inches in length, greater than a foot in length, or greater than two feet in length and decrease in diameter over at least a portion of its length. However, the long draw funnel will maintain a diameter than will allow a pharmaceutical to pass therethrough. In some other embodiments, the prefill assembly 404 may include multiple gated drawers, each drawer including multiple pharmaceutical holding and distribution gates that are configured to release pharmaceuticals to the containers 304 based on received prescription orders that is associated with the containers 304. The pharmaceuticals may be dispensed from the buffer tubes or gated drawers into a container 304 disposed on the pallet 302 when the container 304 is held under the buffer tubes or gated drawers within the pallet assembly 406.

Figure 6:
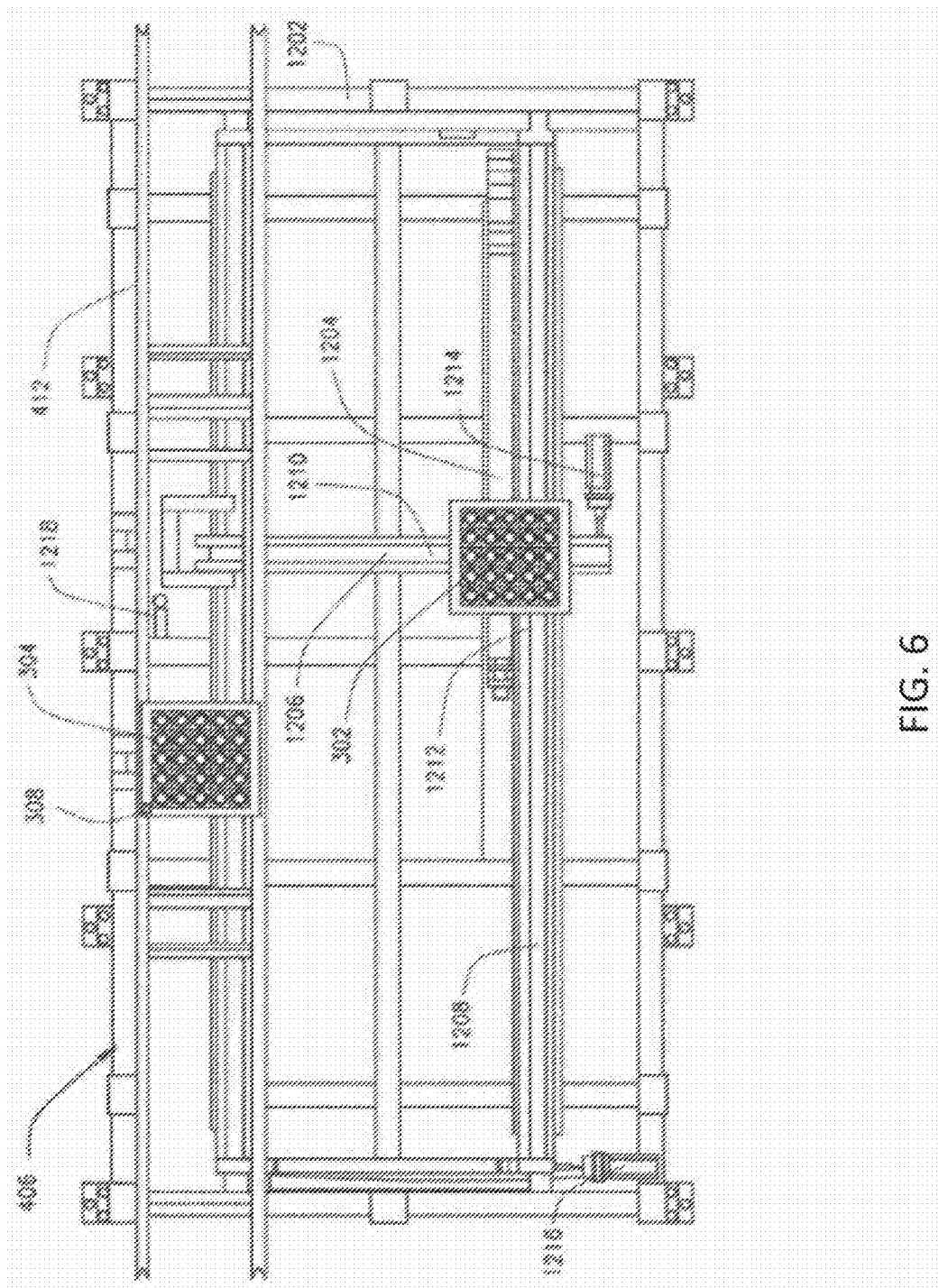
FIG. 6 is a top view of a pallet assembly of the automated dispensing subsystem of FIG. 4, according to an example embodiment.
Figure 7:
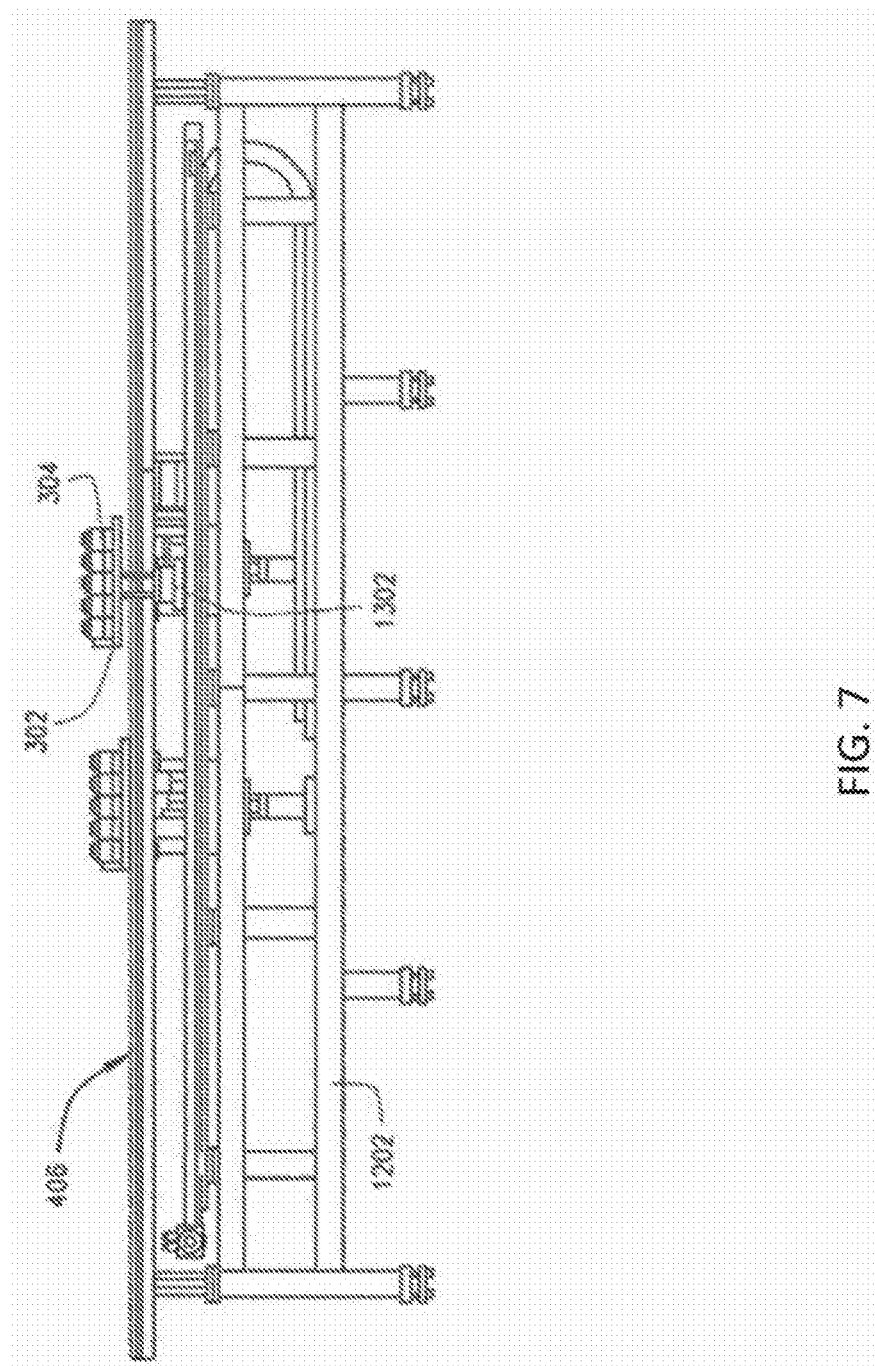
FIG. 7 is a side view of a pallet assembly of FIG. 6.

FIGS. 6 and 7 illustrate a top view and a side view, respectively, of the pallet assembly 406 of the automated dispensing subsystem 204, according to an example embodiment. A pallet assembly frame 1202 provides support in the pallet assembly 406, including the pallet conveyor 412 and an x-y movement apparatus 1204. The x-y movement apparatus 1204 moves the pallet 302 within the pallet assembly 406 of the automated dispensing subsystem 204. The x-y movement apparatus 1204 includes an x-component 1206 and a y-component 1208.

The x-component 1206, in operation, moves a pallet 302 in a direction perpendicular to the pallet conveyor 412. The x-component 1206 includes an x-axis support arm 1210 that supports the pallet 302 as it moves within the pallet assembly 406 and an x-component motor 1214 that actuates the x-component 1206 of the x-y movement apparatus 1204.

The y-component 1208, in operation, moves a pallet 302 in a direction parallel to the pallet conveyor 412. The y-component 1208 includes a y-axis support arm 1212 that supports the pallet 302 as it moves within the pallet assembly 406 and a y-component motor 1216 that actuates the y-component 1208 of the x-y movement apparatus 1204.

The x-y movement apparatus 1204 may engage and move a pallet 302 within the pallet assembly 406 of the automated dispensing subsystem 204 such that the containers 304 in the pallet 302 are moved below the buffer tubes or gated drawers in communication with the cells 414 containing pharmaceuticals to be dispensed into such containers 304, via the system 100.

The pallet assembly 406 may include a lift apparatus 1302. The lift apparatus 1302 may engage the pallet 302 and lift it such that a container 304 on the pallet 302 is aligned to receive pharmaceuticals from the buffer tubes or gated drawers in communication with the cell 414 holding pharmaceuticals to be dispensed into that particular container 304. In an example, the container 304 is positioned directly (or substantially directly) below the exit of a buffer tube or gated drawer in communication with the cell 414 holding pharmaceuticals to be dispensed into that particular container 304. A container 304 may be positioned such that the opening of the container 304 is very close to the exit of a buffer tube or pull out drawer, e.g., less than approximately 0.01 inches, 0.009 inches, 0.008 inches, 0.007 inches, 0.006 inches, 0.005 inches, or 0.004 inches from the exit of the buffer tube or gated drawer.

Figure 12:
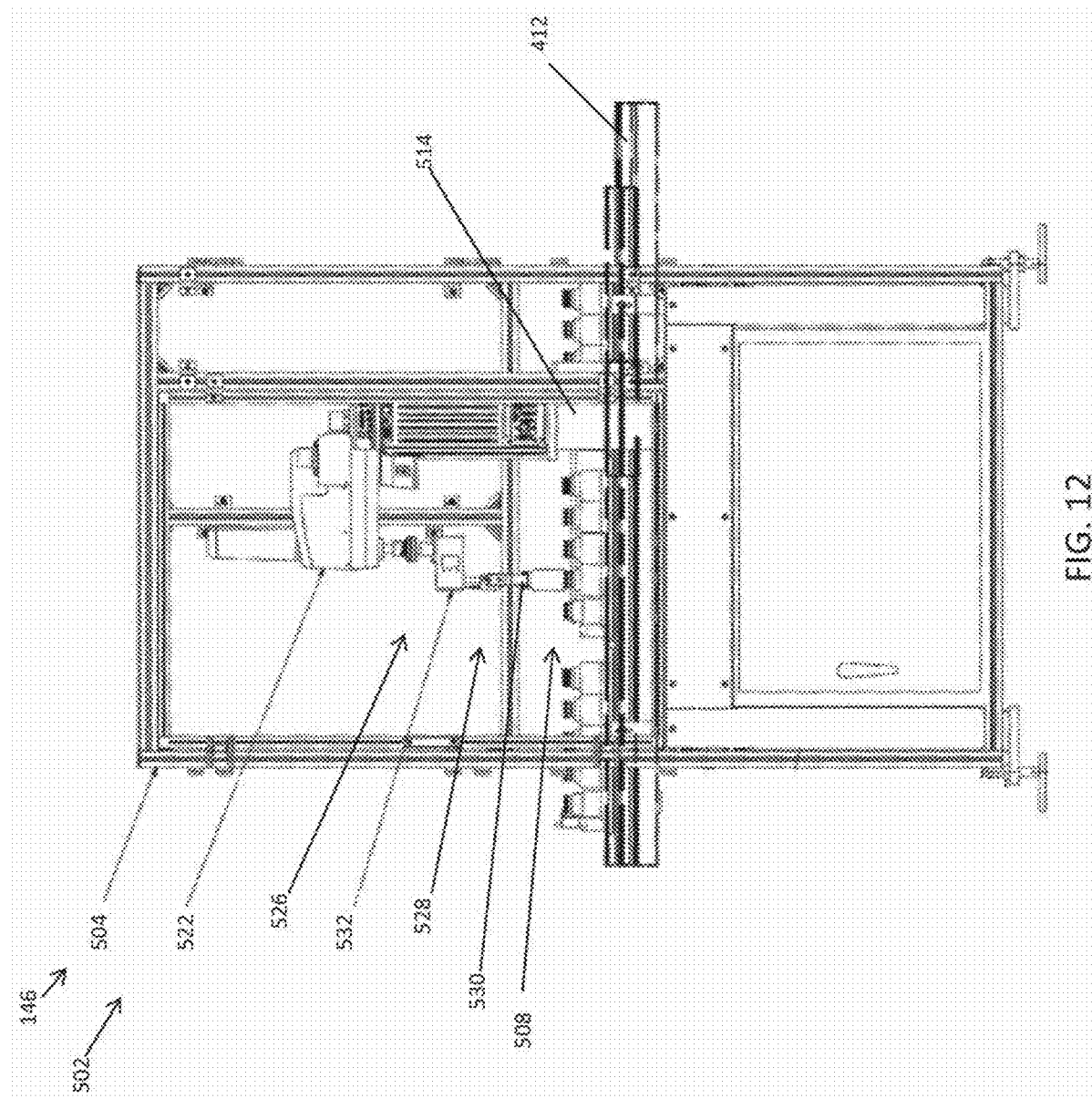
FIG. 12 is a side view of the container sorting subsystem of FIG. 10 without the side panel.
Figure 13:
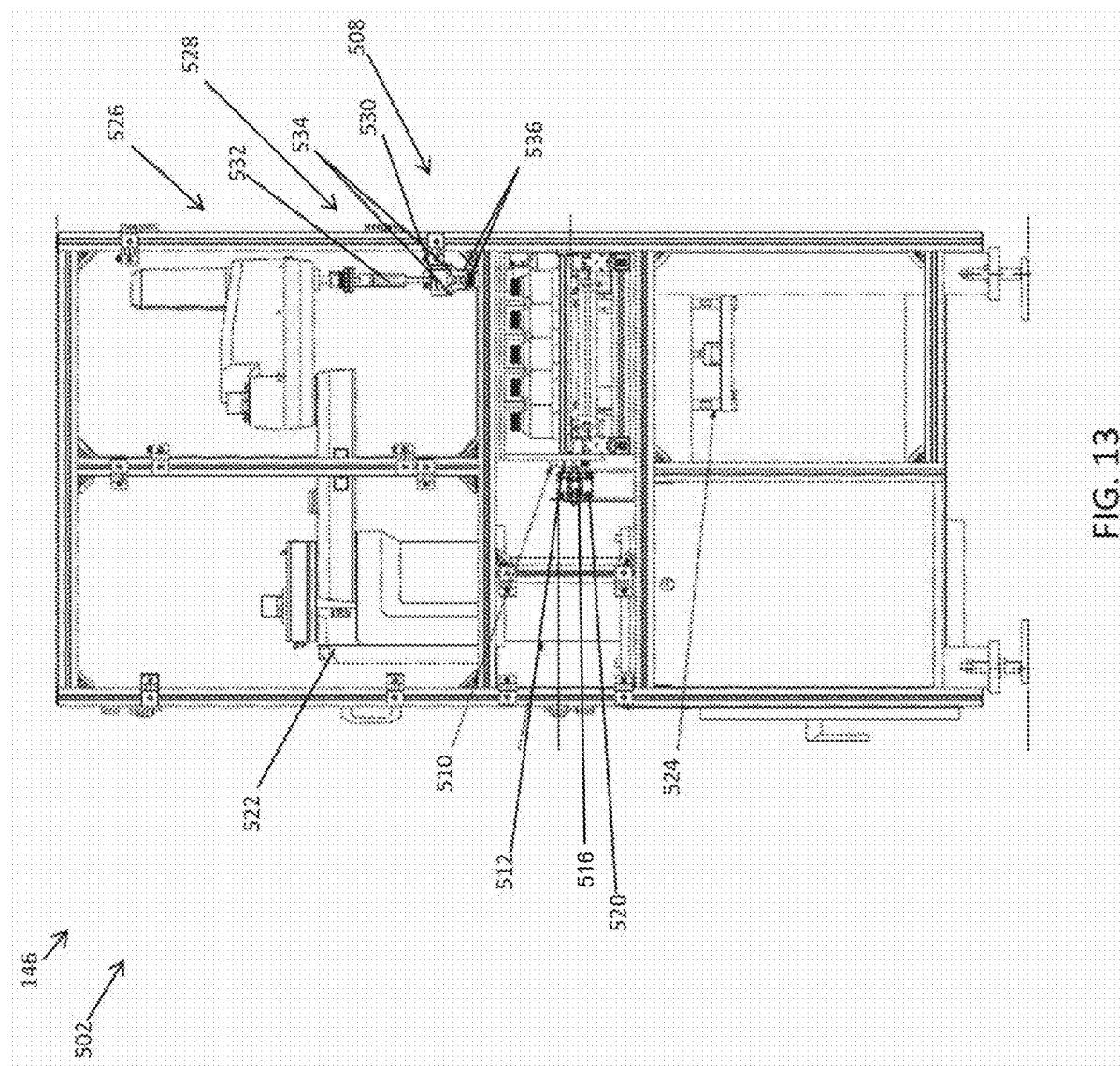
FIG. 13 is a front view of the container sorting subsystem of FIG. 10 without the front panel.
Figure 14:
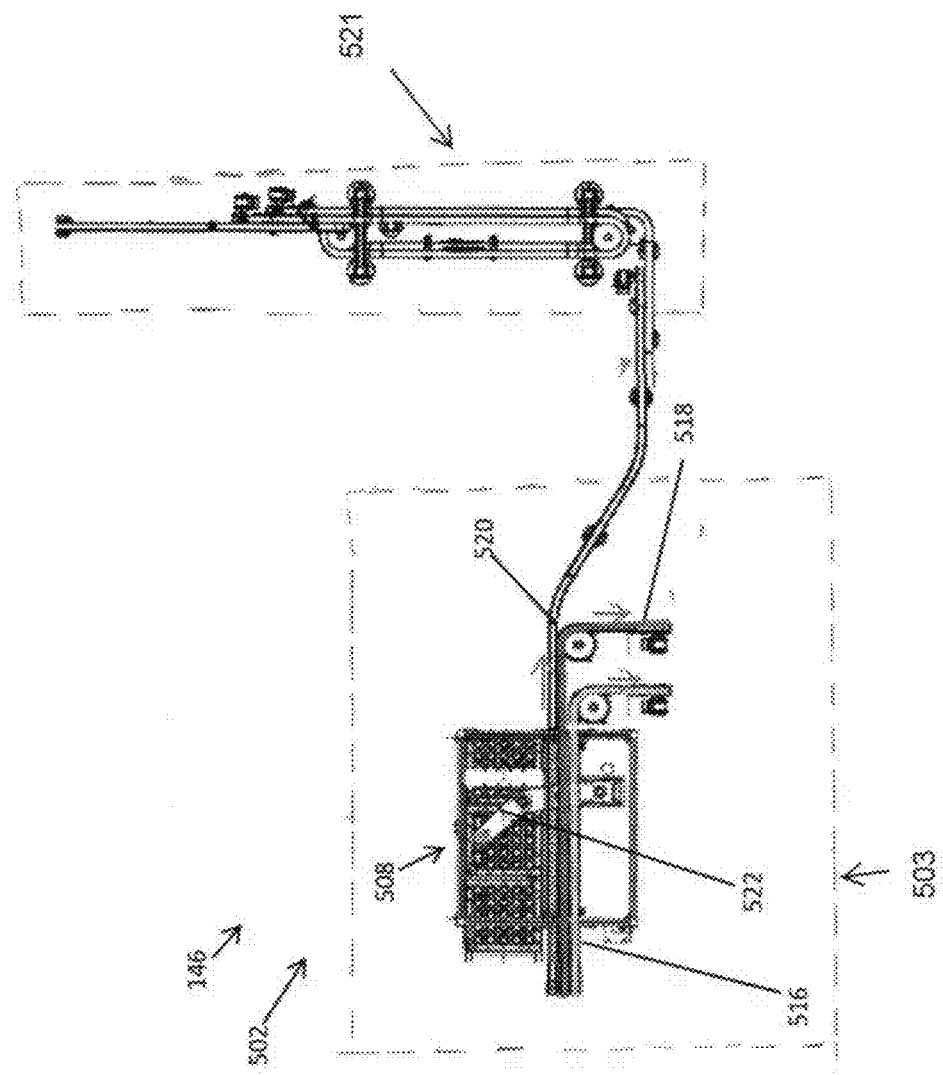
FIG. 14 is a top view of the container sorting subsystem of FIG. 10 illustrating a container sorting subsystem conveyance system layout.

The automated dispensing subsystem 204 may include an RFID reader 1218. The RFID reader 1218 may read data on the RFID tag 308 of the pallet 302 to obtain data associated with the particular pallet 302 and/or containers 304 within the pallet 302, such as order data 110, member data 112, claims data 114, drug data 116, prescription data 118, and/or plan sponsor data 120 associated with prescriptions (or portions of prescriptions) to be filled using containers 304 on that pallet 302. The RFID reader 1218 may write data to the RFID tag 308 of a pallet 302 (or otherwise cause data to be associated with the pallet 302), such as order data 110, member data 112, claims data 114, drug data 116, prescription data 118, and/or plan sponsor data 120 associated with pharmaceuticals dispensed into containers 304 on the pallet 302 via the automated dispensing device 130. Although only one RFID reader 1218 is illustrated on FIG. 12, more than one RFID reader 1218 may be employed in an automated dispensing subsystem 204. When more than one RFID reader 1218 is employed in an automated dispensing subsystem 204, each RFID reader 1218 may be adapted to read the RFID tag 308 on a pallet 302 at a different stage. For example, an RFID reader may read the RFID tags 308 of pallets as they queue for entry into the automated dispensing subsystem 204, another may read the RFID tags 308 of pallets as they enter the automated dispensing subsystem 204, and another may read the RFID tags 308 of pallets 302 as they exit the automated dispensing subsystem 204.

The RFID reader 1218 and/or another RFID reader may read the container identifiers of the containers on the pallet, the automated dispensing subsystem identifier, and the container properties of the containers on the pallet from the RFID tag 308 of a pallet 302 when it queues for entry into the automated dispensing subsystem 204 and may write the container identifiers of the containers 304 to be filled at the automated dispensing subsystem 204 and the identifiers of the particular cells from which the containers will be filled to the RFID tag 308 of the pallet 302. The RFID reader 1218 and/or another RFID reader may read the container identifiers of the containers 304 to be filled at the automated dispensing subsystem 204 and the identifiers of the particular cells from which the containers 304 will be filled from the RFID tag 308 of the pallet 302 when it enters the automated dispensing subsystem 204. The RFID reader 1218 and/or another RFID reader may read the pallet route within the system 100 and the pallet route within the automated dispensing subsystem 204 as it exits the automated dispensing subsystem 204 and may clear the pallet route within the automated dispensing subsystem 204 as it exits the automated dispensing subsystem 204 (e.g., to prevent the pallet 302 from re-entering the same automated dispensing subsystem 204 in an embodiment of the system 100 that employs more than one automated dispensing subsystem 204).

Figure 8:
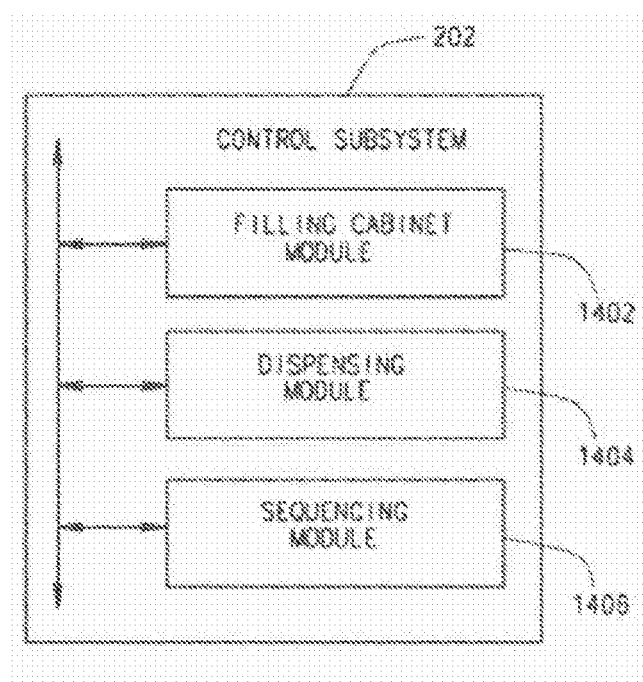
FIG. 8 is a diagram of a control subsystem that may be deployed within the automated dispensing device of FIG. 2, according to an example embodiment.

FIG. 8 illustrates an example control subsystem 202 that may be deployed in the order processing device 102, the automated dispensing device 130, or otherwise deployed in the system 100. One or more modules are communicatively coupled and included in the control subsystem 202 to enable control of the automated dispensing operations of the automated dispensing device 130. The modules of the control subsystem 202 that may be included are a filling cabinet module 1402, a dispensing module 1404, and a sequencing module 1406. Other modules may also be included.

In some embodiments, the modules of the control subsystem 202 may be distributed so that some of the modules are deployed in the order processing device 102 and some modules are deployed in the automated dispensing device 130. In one embodiment, the modules are deployed in memory and executed by a processor coupled to the memory. The functionality contained within the modules 1402-1406 may be combined into a lesser number of modules, further divided among a greater number of modules, or redistributed among existing modules. Other configurations including the functionality of the modules 1402-1406 may be used.

The filling cabinet module 1402 may track quantities of pharmaceuticals placed into the insert 416 in the cell 414 and dispensed from the insert 416. The filling cabinet module 1402 may control operations of the filling cabinet 402. For example, the filling cabinet module 1402 may generate an alert when the quantity of pharmaceuticals in the insert 416 has dropped below a pre-determined level. The level at which an alert is be generated may be dependent upon parameters specific to the particular pharmaceutical, e.g., based on factors such as the size of the pharmaceutical, the typical prescribed quantity of the pharmaceutical, the relative popularity of the pharmaceutical, or other factors. For example, an alert may be generated if the quantity of pharmaceutical is below about 100 units (e.g., pills, capsules or tablets), below about 150 units, below about 200 units, below about 250 units, below about 300 units, or below about 350 units. Other types of thresholds may be used. Regardless of whether an alert has been generated, pharmaceuticals may continue to be dispensed from the insert 416 until it is empty. Alerts generated by the filling cabinet module 1402 may be prioritized. For example, alerts may be prioritized based on criterion such as general popularity of the pharmaceutical held in the cell 414, pending orders in the system 100 for such pharmaceutical, quantity of pharmaceuticals remaining in the cell 414, combinations thereof, or may be otherwise prioritized. The filling cabinet module 1402 may identify a particular cell 414 as being unavailable to the automated dispensing subsystem 204 when the insert 416 is pulled out or removed from the cell 414 of the filling cabinet 402.

The dispensing module 1404 may access data, such as the order data 110, the member data 112, the claims data 114, the drug data 116, the prescription data 118, and/or the plan sponsor data 120, associated with a particular pallet 302. Data may be accessed from the RFID tag 308 of the pallet 302, the sequencing module 1406, or the database 108, for example. Based on such data, the dispensing module 1404 may identify the quantity of pharmaceuticals within a particular cell 414 to be dispensed into a particular container 304 on a particular pallet 302 and may control the operations of the inserts 416 and/or the buffer tubes/gated drawers and/or may otherwise control the operations of the automated dispensing subsystem 204 to cause pharmaceuticals to be dispensed from a cell 414 and, ultimately, into the container 304 on the pallet 302. The dispensing module 1404 may receive the container identifiers of the containers 304 to be filled at the automated dispensing subsystem 204 and may return the identifiers of the cells 414 from which the containers 304 will be filled, the identifier of the automated dispensing subsystem 204, the dispense type, and the dispense quantity.

The sequencing module 1406 may accesses data, such as the order data 110, the member data 112, the claims data 114, the drug data 116, the prescription data 118, and/or the plan sponsor data 120, associated with a particular pallet 302. Data may be accessed from the RFID tag 308 of a pallet 302 or the database 108, for example. Data associated with a particular pallet may be accessed by an RFID reader 1218 of the automated dispensing subsystem 204 or may be otherwise accessed. Based on such data, the sequencing module 1406 may determine which cells 414 within the automated dispensing subsystem 204 to dispense associated pharmaceuticals into the containers 304 on the particular pallet 302. The sequencing module 1406 may determine the sequence in which the particular pallet 302 will move between dispensing positions associated with such cells 414. The sequence may be selected based on factors such as proximity of the cells 414 and/or the buffer tubes/gated drawers from which containers 304 on the pallet 302 will be filled, availability or likely availability of a particular cell 414 (for example, as determined based on whether an alert has been generated for the particular cell 414 by the filling cabinet module 1402, or otherwise generated, and/or the level of such alert), and/or other factors.

The sequence may be selected to minimize wait time at the cell 414. For example, the sequence may be selected (and the operations of the automated processing subsystem 204 may be controlled) such that the container 304 to be filled with a pharmaceutical from the cell 414 arrives at the dispensing position associated with such cell 414 after the pharmaceutical to be dispensed into the container 304 is in a particular holding area of the buffer tube or gated drawer in communication with the cell 414. By way of further example, if the pallet 302 includes more than one container 304 to be filled with a particular pharmaceutical, the sequencing module 1406 may order the filling of the containers on the pallet 302 such that a first container is filled with pharmaceuticals dispensed from the buffer tube or gated drawer in communication with the cell 414 containing the pharmaceutical at a first time and a second container is filled with pharmaceuticals dispensed from such buffer tube or gated drawer at a second time, and wherein at least one other container is filled from the buffer tube or gated drawer in communication with a different cell 414 between the filling of the first container 304 and the second container 304.

If the automated dispensing subsystem 204 includes more than one cell 414 with a particular pharmaceutical, then in such an embodiment, the sequencing module 1406 may determine which of such cells 414 will be used to dispense such pharmaceutical. For example, the sequencing module 1406 may identify a first cell 414 from which a first container 304 will be filled with that particular pharmaceutical and a second cell 414 from which a second container 304 will be filled with that particular pharmaceutical. Other factors may be used to establish the sequence in which the containers 304 in a particular pallet 302 will be filled.

Multiple automated filling subsystems 204 may be deployed in the automated filling device 130 of the system 100. In such an embodiment, one or more of the modules 1402-1406 of the control subsystem 202 and/or the order processing device 102 may determine which one or more automated filling subsystem 204 will be used to fill the containers 304 on a particular pallet 302 and may control the operations of the one or more automated filling subsystems 204 and/or the system 100 to cause pharmaceuticals to be dispensed into the containers 304 on such pallet 302 from cells 414 of such one or more than one automated filling subsystems 204.

Figure 9:
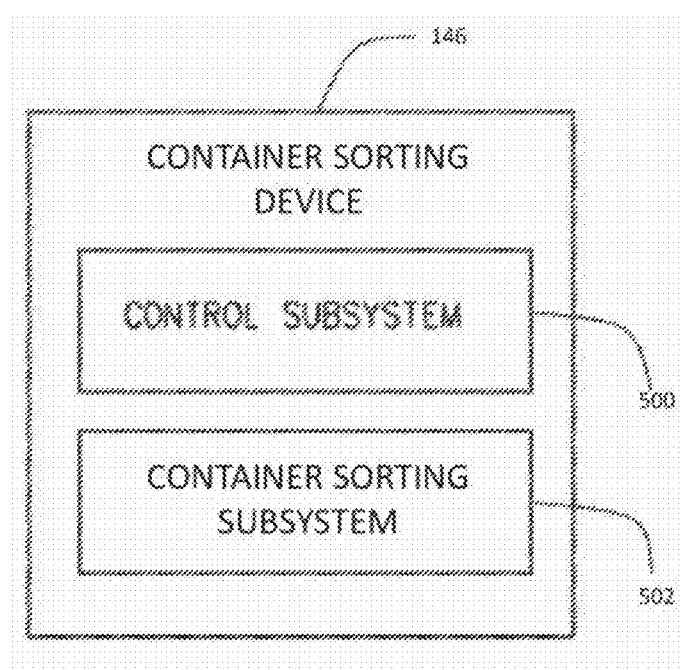
FIG. 9 is a block diagram of an example container sorting device that may be deployed within the system of FIG. 1, according to an example embodiment.
Figure 10:
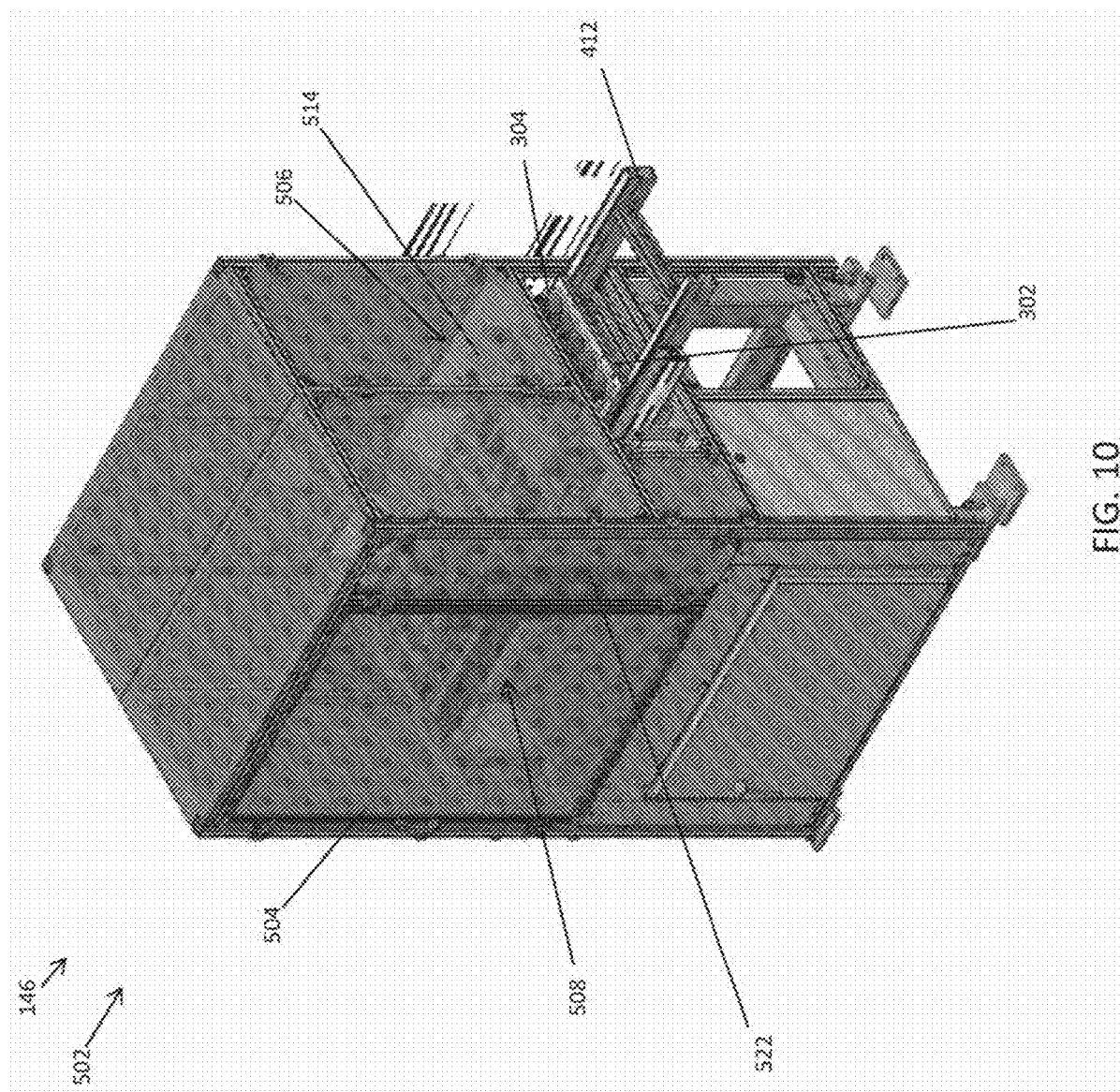
FIG. 10 is a perspective view of a container sorting subsystem deployable within the container sorting device of FIG. 9, according to an example embodiment.
Figure 11:
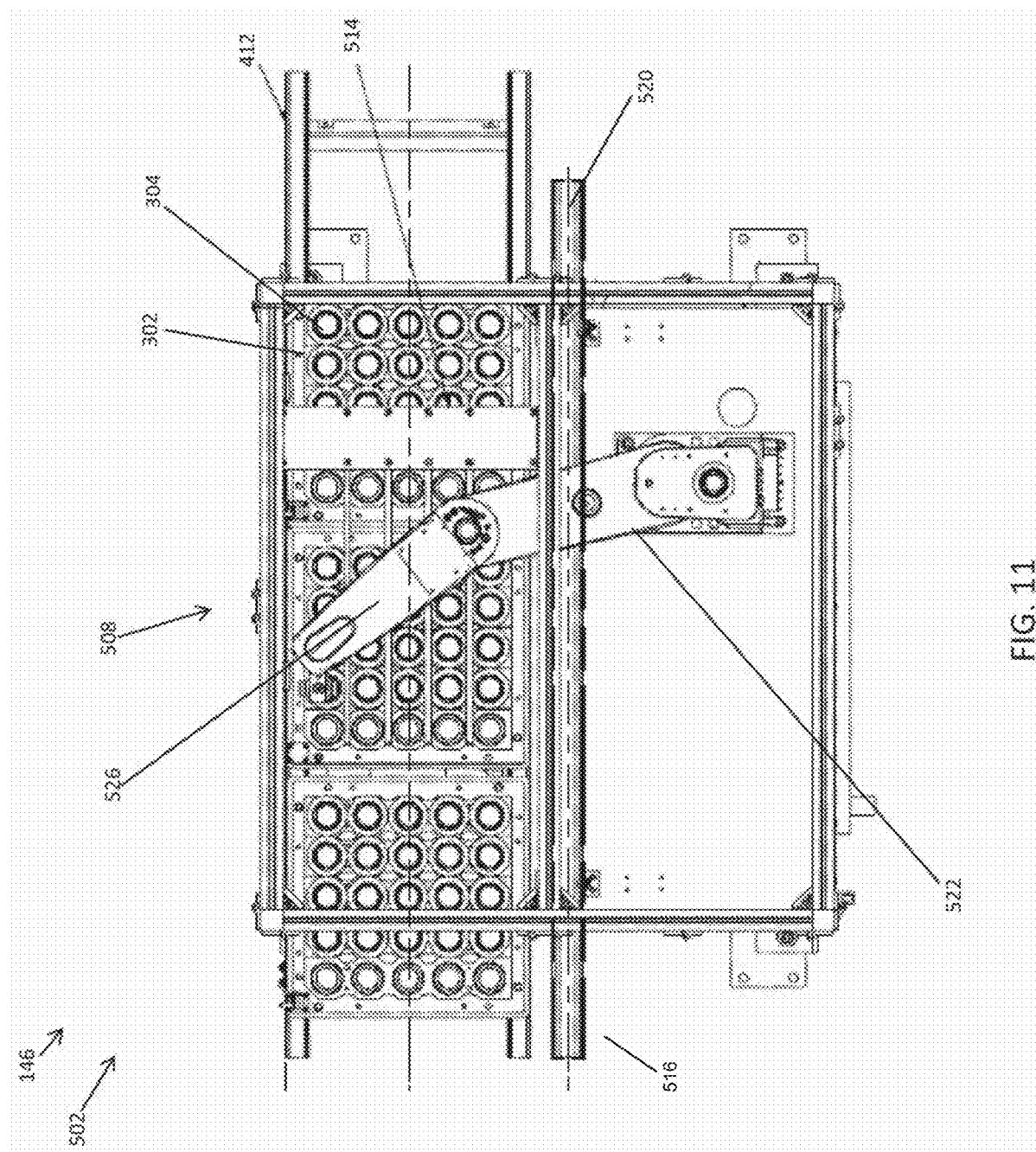
FIG. 11 is a top view of the container sorting subsystem of FIG. 10 without the top panel.

FIG. 9 illustrates a container sorting device 146, according to an example embodiment. The container sorting device 146 may be deployed in the system 100 of FIG. 1, for example. The container sorting device 146 may include a container sorting control subsystem 500 and a container sorting subsystem 502. The container sorting control subsystem 500 may include one or more modules and enables the container sorting device 146 to control the container sorting subsystem 502, while the container sorting subsystem 502 may include one or more devices and enables the container sorting device 146 with sorting operations (e.g., transferring container(s) 304 from a pallet 302 to a disposition area).

An example deployment of the container sorting device 146 is within the system 100. In such a deployment, as described above in detail, the system 100 includes one or more than one conveyor(s) or other devices to facilitate transporting the containers 304 or pallets 302 of containers 304 through mechanical devices within the system 100, such as devices to label, fill, cap, and check containers 304. The container sorting device 146 may be otherwise deployed.

FIGS. 10-14 and 18-19 illustrate the container sorting subsystem 502, according to an example embodiment. The container sorting subsystem 502 may be deployed within the container sorting device 146, for example. In this embodiment, the container sorting subsystem is located within a controlled access area 503 (sometimes referred to as a "control cage"). For example, pharmaceuticals in this area 503 may be for example C3, C4 or C5 controlled substances. The controlled access area 503 can be a specifically designated area within the high volume pharmacy where controlled substances are handled, stored, or processed to fill prescription orders. The controlled access area 503 can enclose additional components, e.g., the conveyors, the automated dispensing subsystem 204, filled pallets, pallet transfers, and other components described herein. The container sorting subsystem 502 enables transferring containers 304 containing pharmaceuticals associated with a prescription order from a pallet 302 to one of multiple container transport systems such that the containers 304 of a given prescription order are grouped together for transport or other disposition and/or unloaded from the pallet 302 on a per-prescription order basis. In this embodiment, the container sorting subsystem 502 is configured to receive filled pallets 302 from one of the automated filling subsystem 204 and the automated filling device 130. In some embodiments, the container sorting subsystem may be configured to receive filled pallets 302 from any other device, system, or subsystem of system 100.

The container sorting subsystem 502 may include a plurality of guards 504 enclosing a container sorting workspace 506, a pallet unloading area 508, a sensor bracket 510, a sensor 512, a puck stop rail assembly 514, a first exception conveyor 516, a second exception conveyor 518, a standard order conveyor 520, a container manipulation device 522, and a pallet lift 524. A portion of the pallet conveyor 412 extends through the container sorting subsystem 502 and is configured to transport the pallets 302 between the automated dispensing device 130 and at least one container sorting subsystem 502 of the container sorting device 146 In other contemplated embodiments, the container sorting subsystem 502 may include any other component in any number that facilitates operation of the container sorting subsystem 502 and the container sorting device 146 as described herein.

In this embodiment, the plurality of guards 504 substantially surrounds the container sorting workspace 506 of the container sorting subsystem 502. More specifically, the plurality of guards 504 are positioned and configured such that the plurality of guards 504 inhibit an operator from accessing the workspace 506 and interacting with the container manipulation device 522 during operation of the container sorting subsystem 502. The plurality of guards 504 encloses the volume above and around the sides of the container sorting subsystem 502, while being open from the bottom to receive a filled pallet and provide entrances and exits for the conveyors. The container sorting workspace 506 is guarded from the operator(s) at least partially by substantially solid guards 504. In some other embodiments, the container sorting workspace 506 is guarded from the operator(s) at least partially by a sensor configured to detect entry of any portion of the operator(s) into container sorting workspace 506 and to cause at least the container manipulation device 522 to discontinue operation and movement.

Within the sorting workspace 506, the pallet unloading area 508 is defined adjacent to the container manipulation device 522 and includes at least a portion of the pallet conveyor 412 that extends through the container sorting subsystem 502. In this embodiment, the pallet unloading area 508 is sized to retain at least one pallet 302. In some other embodiments, the pallet unloading area 508 may be sized to contain any number of pallets 302 and the container sorting subsystem 502 may be configured to transfer containers from any of the pallets 302 such that the container sorting subsystem 502 is able to group containers 304 of a prescription order together. The sensor bracket 510 extends across at least a portion of the pallet unloading area 508 and is configured to retain the sensor 512 such that the sensor 512 is operable to interact with the RFID tag 308 on the pallet 302. The sensor 512 is configured to communication with at least the container sorting control subsystem 500 to transfer the information from the RFID tag 308 such that the container sorting control subsystem 500 is operable to control the container manipulation device 522 based on the received data from the RFID tag 308. In some other embodiments, a plurality of sensors 512 may be located within the container sorting workspace 506 to facilitate identification of the containers 304 within at least one pallet 302.

The puck stop rail assembly 514 includes arms 515 and extends at least partially around and through the pallet unloading area 508. The pallet lift 524 is positioned vertically below the puck stop rail assembly 514 and is configured to move at least the pallet 302 along the vertical direction in the unloading area 508 during operation of the container sorting subsystem 502 and in cooperating with the container manipulation device 522. In an example embodiment, the puck stop rail assembly 514 is configured to at least partially constrain movement of the pallet 302 in the pallet unloading area 508 during operation pallet lift 524. In this embodiment, the pallet lift 524 is configured to lift a single pallet 302 along the vertical direction. In some other embodiments, the pallet lift 524 may be configured to lift and/or lock into a working position one or more than one pallet 302 aligned along any direction that facilitates operation of the container sorting device 146 as described herein.

The puck stop rail assembly also at least partially constrains movements of the pucks on the pallet 302. In an example embodiment, the arms 515 of the puck stop rail assembly 514 extend along rows of pucks in the pallet 302. The arms 515 have a length from a base at one end to the puck at a far end of the pallet 302. The bottom of the arms 515 may contact the top surface of the puck if the puck is lifted from the cavity in the pallet 302, e.g., when a container is lifted from the puck and pallet. A single arm 515 may contact the pucks of two adjacent rows of pucks in the pallet. The number of arms 515 may be less than the number of rows in the pallet 302, e.g., one less or half the number of rows.

In this embodiment, the standard order conveyor 520 extends through the container sorting subsystem 502 adjacent to the pallet conveyor 412 and from the container sorting subsystem to a downstream device within the high volume pharmacy system 100. The first exception conveyor 516 extends through the container sorting subsystem 502 adjacent to the standard order conveyor 520 along a side of the standard order conveyor 520 that is opposite a side that is adjacent to the pallet conveyor 412 and to a first inspection pallet unloading area 508 outside of the container sorting workspace 506. The second exception conveyor 518 extends through the container sorting subsystem 502 adjacent to the first exception conveyor 516 along a side of the first exception conveyor 516 opposite to the side of the first exception conveyor 516 that is adjacent to the standard order conveyor 520 and to a second inspection pallet unloading area 508 that is outside of the container sorting workspace 506. The first exception conveyor 516, the second exception conveyor 518, and the standard order conveyor 520 all extend through the controlled access area 503.

The container manipulation device 522 includes a movement apparatus 526 and a gripper assembly 528. In this embodiment, the movement apparatus 526 is a multi-axis robot configured to move the gripper assembly 528 such that a container 304 may be moved from the pallet 302 to one of the standard order conveyor 520, the first exception conveyor 516, and the second exception conveyor 518. In some other embodiments, the container manipulation device may be at least one of a robot, for example a collaborative robot, a selective-compliance-articulated robot arm, a six-axis robot, a cylindrical robot, a delta robot, a polar coordinate robot, a vertically articulated robot, and a Cartesian coordinate robot. In some embodiments, the container manipulation device 522 is configured to move more than one container 304 during each cycle of the container sorting subsystem 502.

In this embodiment, the gripper assembly 528 includes a single gripper head 530 and a gripper head arm 532. The gripper head arm is coupled between the movement apparatus 526 and the gripper head 530. The gripper head 530 includes a pair of opposing gripper jaws 534 and is configured to grip and to release the container 304. In this embodiment, the gripper head 530 is biased closed, that is the gripper head 530 uses spring force to maintain the pair of gripper jaws 534 in a closed position. The gripper head 530 is independently, pneumatically actuated such that activation of a pneumatic pressure sources causes the pair of gripper jaws 534 to move from the closed position to the open position, wherein the open position represents a distance between each gripper jaw 534 of the pair of gripper jaws 534 that is at greater than a diameter of the containers 304 within the pallet 302. In an example embodiment, the gripper head 530 is independently, electrically actuated such that an electrical signal can activate a motor or solenoid to cause the pair of gripper jaws 534 to move from the closed position to the open position At least a portion of each gripper jaw 534 of the pair of gripper jaws 534 includes a friction-enhanced surface 536. More specifically, the friction-enhanced surface 536 is configured to enhance a coefficient of friction between the containers 304 and the pair of gripper jaws 534 to facilitate retrieval of the containers 304 from within the cavities 306 of the pallet 302 that is in the pallet unloading area 508. In an example embodiment, the friction-enhanced surface 536 has a coefficient of friction greater than the pair of gripper jaws 534 when engaging containers 304. In some embodiments, the gripper assembly may include any number of gripper jaws 534 in any orientation that facilitates operation of the container manipulation device 522 as described herein.

In this embodiment, after the container manipulation device 522 has placed at least one container 304 making up a prescription order on one of the standard order conveyor 520, the first exception conveyor 516, and the second exception conveyor 518, the respective conveyor 516-520 transports the prescription order including at least one container 304 to one of a plurality of downstream devices and/or positions within the high volume pharmacy system 100. More specifically, in this embodiment, containers 304 that make up a single prescription order and that are placed on the standard order conveyor 520 by the container manipulation device 522 are transferred in the order that they are placed on the standard order conveyor 520 from within the container sorting subsystem 502 to a downstream device and/or position within system 100. For example, multiple containers 304 that are part of a same order are placed sequentially on the standard order conveyor 520 by the container manipulation device 522.

Containers 304 that make up a single prescription order and are of a predetermined category, for example a controlled substance such as a narcotic, or that are flagged for a particular exception and that are placed on the first exception conveyor 516 by the container manipulation device 522 are transferred in the order that they are placed on the first exception conveyor 516 from within the container sorting subsystem 502 to a first inspection pallet unloading area 508. Containers 304 that make up a single prescription order and are of a predetermined second category, for example a second type of controlled substance, or that are flagged for another type of exception and that are placed on the second exception conveyor 518 by the container manipulation device 522 are transferred in the order that they are placed on the second exception conveyor 518 from within the container sorting subsystem 502 to a second inspection pallet unloading area 508. In some embodiments, the conveyors 516-520 may transport the containers 304 in any manner that facilitates operation of the system 100 as described herein.

In this embodiment, the standard order conveyor 520 is configured to transport the containers 304 of a prescription order from the container sorting subsystem 502 to, for example, at least one of devices 122-144 for further processing. In some embodiments, the standard order conveyor 520 may transfer the containers 304 of a prescription order to a tote or other type of transfer device for further processing. In additional embodiments, the standard order conveyor 520 may include a plurality of spacing apparatuses configured to maintain spacing of the containers 304 of each prescription order as the containers are transported along the standard order conveyor 520. As shown on the right side of FIG. 14, an elevated section 521 may be used to convey containers 304 to or from the controlled access area 503 at a first vertical height at the controlled access area 503 from or to an elevated, second height relative to the first height.

Figure 15:
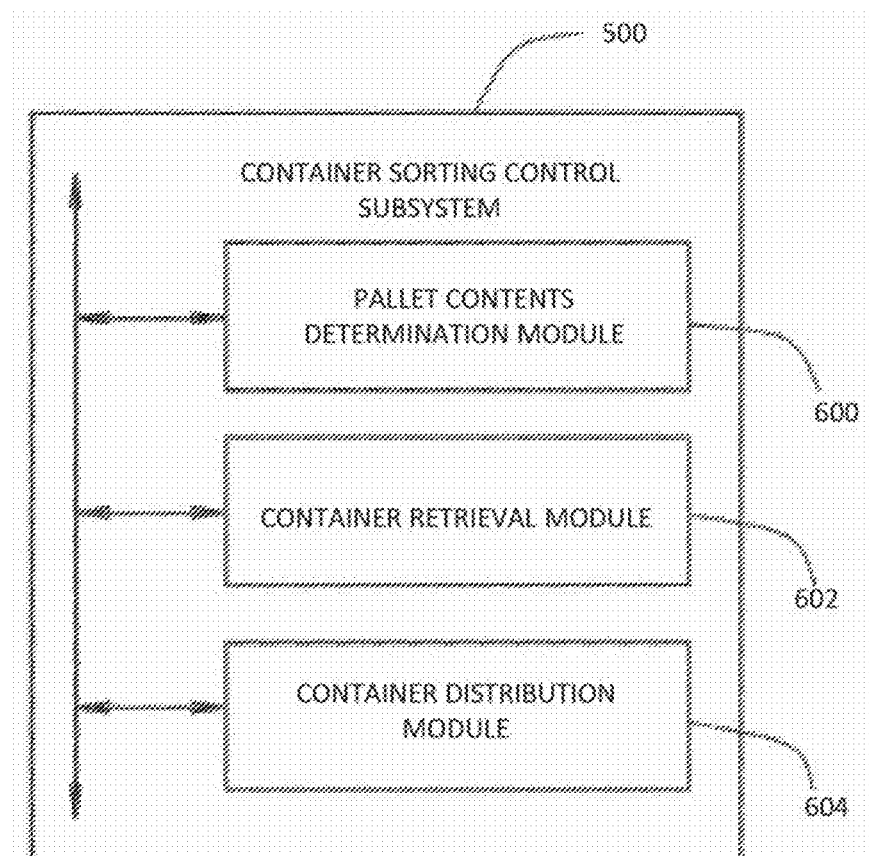
FIG. 15 is a diagram of a control subsystem that may be deployed within the container sorting device of FIG. 9, according to an example embodiment.

FIG. 15 illustrates an example container sorting control subsystem 500 that may be deployed in the order processing device 102, the container sorting device 146, or otherwise deployed in the system 100. One or more modules are communicatively coupled and included in the container sorting control subsystem 500 to enable control of the container sorting operations of the container sorting device 146. The modules of the container sorting control subsystem 500 that may be included are a pallet contents determination module 600, a container retrieval module 602, and a container distribution module 604. Other modules may also be included.

In some embodiments, the modules of the container sorting control subsystem 500 may be distributed so that some of the modules are deployed in the order processing device 102 and some modules are deployed in the container sorting device 146. In one embodiment, the modules are deployed in memory and executed by a processor coupled to the memory. The functionality container within the modules 600-602 may be combined into a lesser number of modules, further divided among a greater number of modules, or redistributed among existing modules. Other configurations including the functionality of the modules 600-602 may be used.

The pallet contents determination module 600 may access data, such as the order data 110, the member data 112, the claims data 114, the drug data 116, the prescription data 118, and/or the plan sponsor data 120, all associated with a particular pallet 302 that has been received within the container sorting subsystem 502. Data may be accessed from the RFID tag 308 of the pallet 302 or the database 108, for example. In some embodiments, data may be accessed from a barcode or other data storage system associated with the pallet 302. Based on such data, the pallet contents determination module 600 may identify the container 304 within a particular cavity 306 of the pallet and associate it with a prescription order based on the data received. The pallet contents determination module 600 may receive the container identifiers of the containers 304 to be removed from the pallet 302 and transferred to an appropriate disposition area by the container sorting subsystem 502 and may return the location of the containers 304 within the pallet 302 from which the containers 304 may be removed and associated with a prescription order by the container sorting subsystem 502.

The container retrieval module 602 may access data, such as the order data 110, the member data 112, the claims data 114, the drug data 116, the prescription data 118, the plan sponsor data 120, and/or data received from the pallet contents determination module 600 associated with a particular pallet 302. Data may be accessed from the RFID tag 308 of a pallet 302 or the database 108, for example. Data associated with a particular pallet may be accessed by an RFID reader 1218 of the container sorting subsystem 502 or may be otherwise accessed. Based on such data, the container retrieval module 602 may determine which cavity 306 a container 304 associated with a prescription order is located within. The container retrieval module 602 may then control operations of the container manipulation device 522 of the container sorting subsystem 502 to cause the container manipulation device 522 to retrieve the container 304 associated with the prescription order from the cavity 306 within the pallet 302.

The container distribution module 604 accesses data, such as the order data 110, the member data 112, the claims data 114, the drug data 116, the prescription data 118, the plan sponsor data 120, data received from the pallet contents determination module 600 associated with a particular pallet 302, and/or data received from the container retrieval module 602. Based on such data, the container distribution module 604 may determine which conveyor 516-520 the container 304 being moved by the container manipulation device 522 is to be placed on. The container distribution module 604 may control operations of the container manipulation device 522 to cause the container manipulation device 522 to place the container 304 on one of the conveyors 516-520 based on the prescription order the container 304 is associated with and/or the type of pharmaceutical contained within the container 304. The module 604 suitably instructs the device 522 to cause containers 304 in the same order to be picked sequentially, as further described below. Additionally, the container distribution module 604 may control the operations of conveyors 516-520 based on data such as the order data 110, the member data 112, the claims data 114, the drug data 116, the prescription data 118, the plan sponsor data 120, data received from the pallet contents determination module 600 associated with a particular pallet 302, and/or data received from the container retrieval module 602.

For example, a first container 304 associated with a first prescription order and containing a non-controlled, over-the-counter pharmaceutical will be placed on the standard order conveyor 520 by the container manipulation device 522 at the direction of the container distribution module 604. A second container 304 associated with the first prescription order and also containing a non-controlled pharmaceutical will also be placed on the standard order conveyor 520 by the container manipulation device 522 in sequential order with the first container 304 and in relatively close proximity to the first container 304 at the direction of the container distribution module 604. In some embodiments, the container manipulation device 522 may be configured to place the containers 304 in any order and at any spacing relative to the other containers 304 that facilitates operation of the system 100 as described herein. The spatial proximity of the first container 304 and the second container 304 may be the result of the container manipulation device 522 transferring the containers 304 from the pallet 302 to the standard order conveyor 520 relatively rapidly, as compared to the operational speed of the standard order conveyor 520. Alternatively, the spatial proximity of the containers 304 may be the result of the container distribution module 604 stopping movement of the standard order conveyor 520 during assembly of the containers 304 associated with the first prescription order by the container manipulation device. For example, the container distribution module 604 may alter the spatial separation of multiple containers 304 and/or multiple prescription orders on any of the conveyors 516-520 by coordinating the operation of the container manipulation device 522 and the conveyors 516-520.

In another example, a third container 304 associated with a second prescription order and containing a controlled substance having a certain classification (e.g., C3-C5) will be placed on one of the first exception conveyor 516 and the second exception conveyor 518 by the container manipulation device 522 at the direction of the container distribution module 604 based on the data received and/or determined by the container distribution module. In some examples, first exception conveyor 516 includes an endstop for retrieval of an order by a technician, or for sample checking. In other examples, second exception conveyor 518 includes an end-stop for multiple container orders and for technician retrieval.

Multiple container sorting subsystems 502 may be deployed in the container sorting device 146 of the system 100. In such an embodiment, one or more of the modules 600-602 of the container sorting control subsystem 500 and/or the order processing device 102 may determine which one of the container sorting subsystems 502 will be used to sort the containers 304 on a particular pallet 302 and may control the operations of the one or more container sorting subsystems 502 and/or the system 100 to cause pharmaceutical-containing containers 304 associated with certain prescription orders to be transferred from the pallets 302 to conveyors 516-520 based on the associated prescription order and the contents of the containers 304. Grouping together the containers 304 that are associated with a prescription order facilitates more efficient processing of the prescription order by the downstream processes within the system 100 and potential elimination and/or combination of portions of the downstream processes. For example, using the container sorting subsystems 502 to group together the containers 304 of each prescription order facilitates efficiently packing and shipping the containers 304 of each prescription order as a complete prescription order by the system 100.

Figure 16:
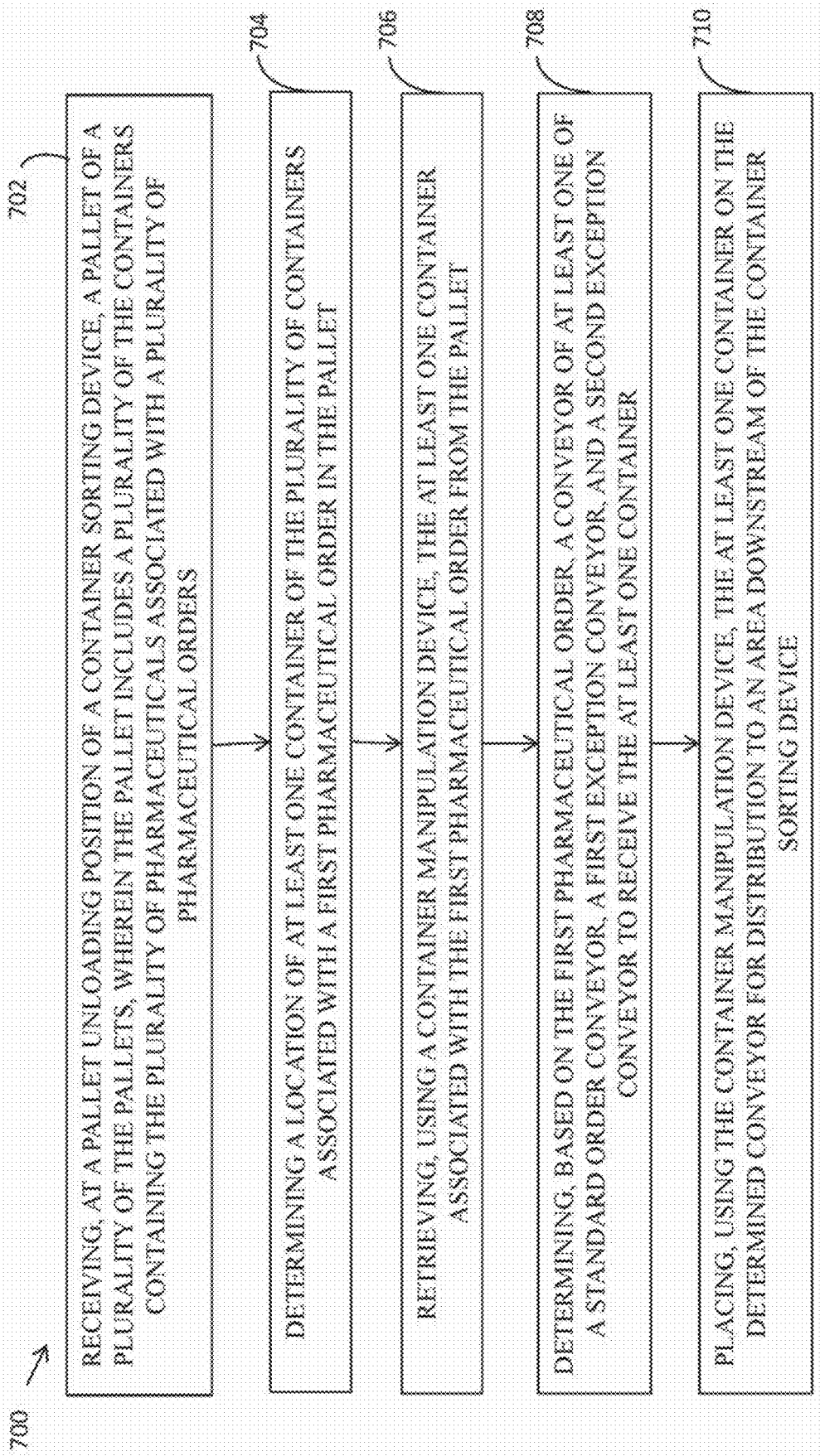
FIG. 16 is an example process flow of a method of configuring a pallet, according to an example embodiment.

FIG. 16 illustrates a method 700 for sorting containers 304 containing pharmaceuticals positioned in pallets 302 and associated with prescriptions orders. The method 700 may be performed by the container sorting device 146, partially by the order processing device 102 and partially by the container sorting device 146, or may otherwise be performed.

At step 702, a pallet 302 is received in a pallet unloading area 508 of the container sorting subsystem 502. In this embodiment, the pallet 302 contains a plurality of containers 304 positioned within a plurality of cavities 306 of the pallet 302. At step 704, a location in the pallet 302 of a first container 304 associated with a first prescription order is determined based on the data from the RFID tag 308 affixed to the pallet 302, for example. At step 706, the first container 304 is retrieved from the determined cavity 306 by the container manipulation device 522. At step 708, a conveyor 516-520 to receive the first container 304 is determined by the container sorting device 146 based on the associated prescription order. At step 710, the container manipulation device 522 places the first container 304 on the determined conveyor 516-520 for distribution to a respective downstream area or device within the system 100.

Figure 17:
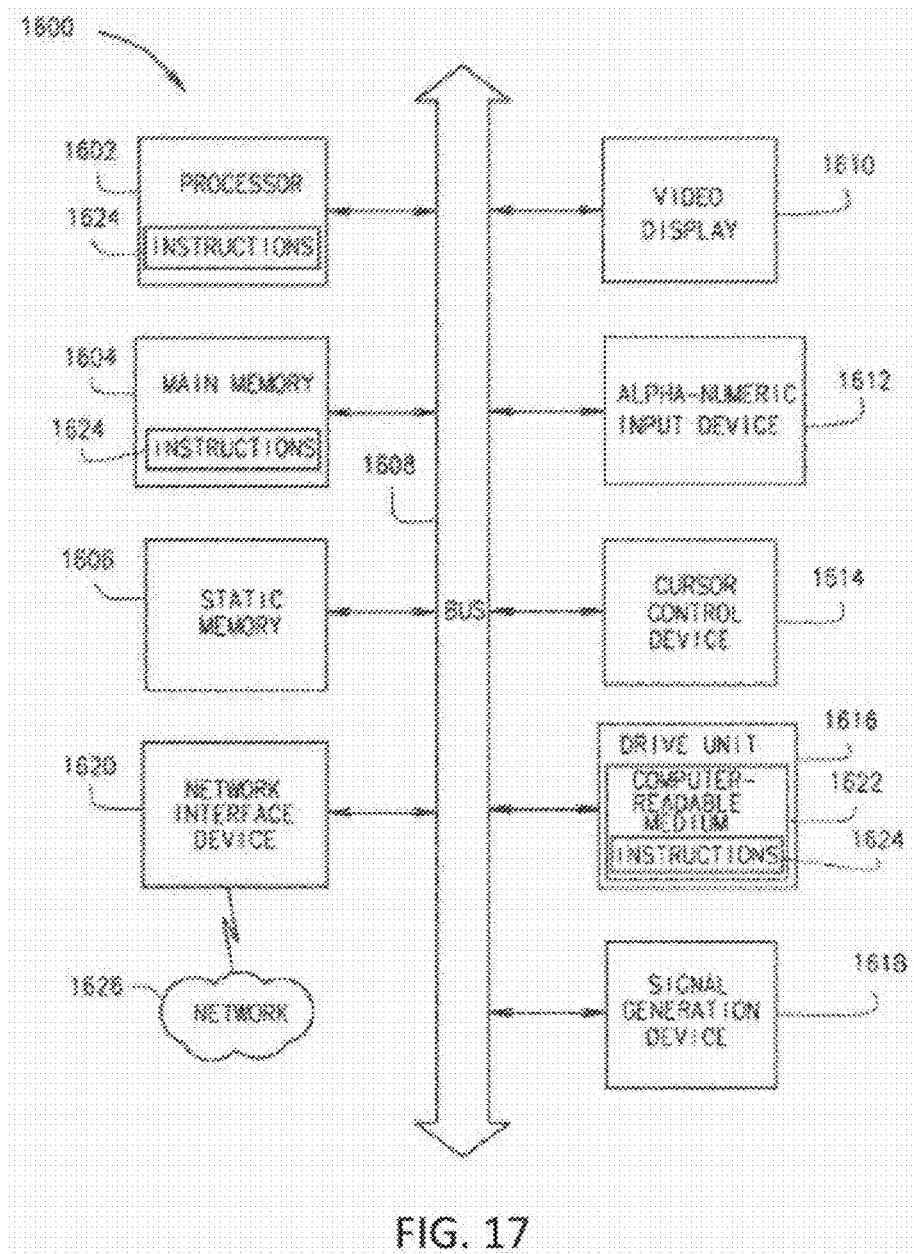
FIG. 17 is a block diagram of an example machine in the form of a computer system within which a set of instructions for causing the machine to perform any one or more of the methodologies discussed herein may be executed or stored.
Figure 18:
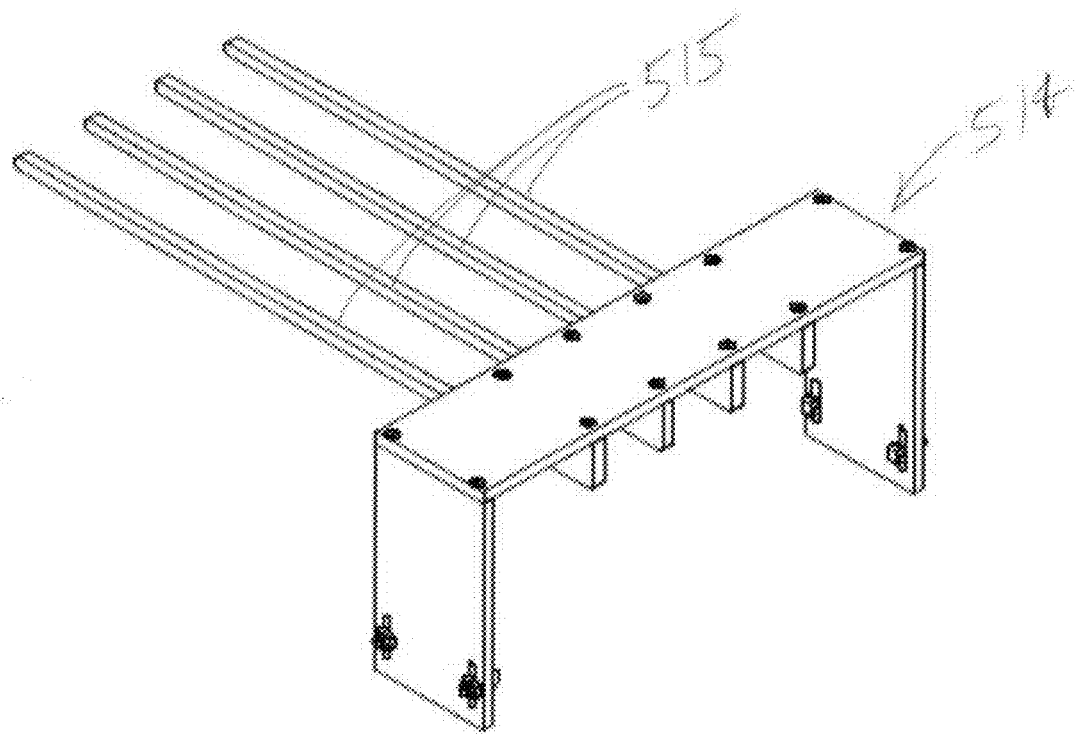
FIG. 18 is a perspective view of a puck stop assembly shown in FIG. 10.
Figure 19:
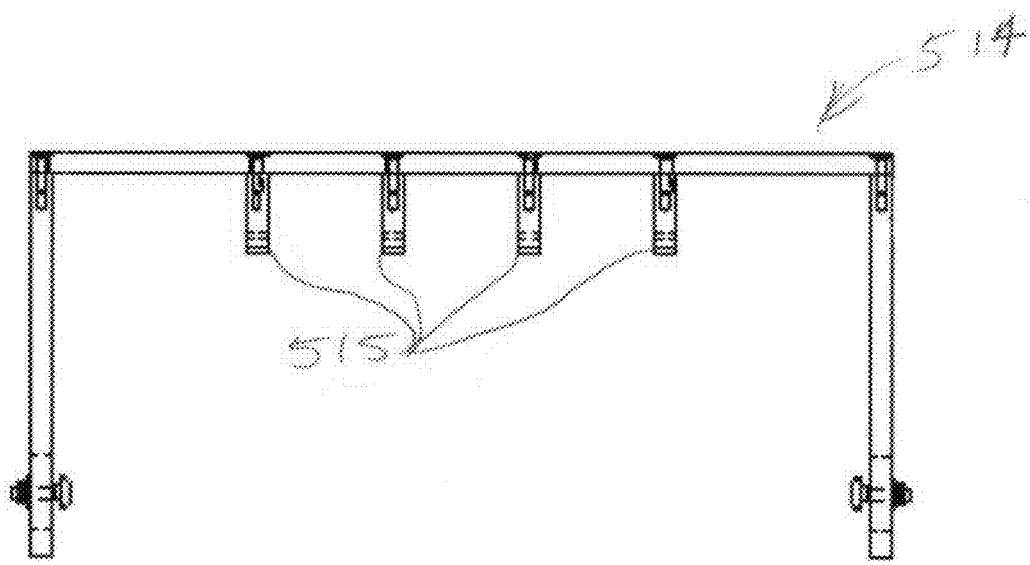
FIG. 19 is an end view of the puck stop assembly of FIG. 18.

FIG. 17 shows a block diagram of a machine in the example form of a computer system 1600 within which a set of instructions may be executed causing the machine to perform any one or more of the methods, processes, operations, or methodologies discussed herein. The devices 102, 106, 122-146 may include the functionality of the one or more computer systems 1600.

As can be seen from the above description, the system does not require a rotary sortation wheel, i.e., is free of a rotary sortation wheel, and thus can process orders more quickly. The system enables quicker resolution of exceptional containers or orders, and reduces the need for manual sortation. And it automatically groups like bottles/containers of the same order, even though they may be spread out across a pallet or multiple pallets. "Automatically" in this disclosure refers to grouping containers of the same order as they are removed from the one or more pallets.

In one embodiment, the method of this disclosure enables simultaneous grouping of five unassociated containers from a single pallet. This may be performed in the same time a prior system handled only one container from a single pallet.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a gaming device, a set-top box (STB), a Personal Digital Assistant (PDA), a cellular telephone, a web appliance, a network router, switch or bridge, or any machine capable of executing a set of instructions sequential or otherwise) that specifies actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1600 includes a processor 1602 (e.g., a central processing unit (CPU) a graphics processing unit (GPU) or both), a main memory 1604 and a static memory 1606, which communicate with each other via a bus 1608. The computer system 1600 further includes a video display unit 1610 (e.g., a liquid crystal display (LCD) or a cathode ray tube (CRT)). The computer system 1600 also includes an alphanumeric input device 1612 (e.g., a keyboard), a cursor control device 1614 (e.g., a mouse), a drive unit 1616, a signal generation device 1618 (e.g., a speaker) and a network interface device 1620.

The drive unit 1616 includes a computer-readable medium 1622 on which is stored one or more sets of instructions (e.g., software 1624) embodying any one or more of the methodologies or functions described herein. The software 1624 may also reside, completely or at least partially, within the main memory 1604 and/or within the processor 1602 during execution thereof by the computer system 1600, the main memory 1604 and the processor 1602 also constituting computer-readable media.

The software 1624 may further be transmitted or received over a network 1626 via the network interface device 1620.

While the computer-readable medium 1622 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine and that cause the machine to perform any one or more of the methodologies of the present invention. The term "computer-readable medium" shall accordingly be taken to include, but not be limited to, solid-state memories, and optical media, and magnetic media. In some embodiments, the computer-readable medium is a non-transitory computer-readable medium.

The present application uses the term "module" to describe various structural components that may include processors and memories operable connected to the processors. The processors include circuitry for executing instructions, which can be stored in memory, on inputs to the circuitry to produce control signals to control physical components of the system 100 described herein.

When introducing elements of various embodiments of the present invention, the articles "a", "an", "the", and "said" are intended to mean that there are one or more of the elements. The terms "comprising", "including", and "having" are intended to be inclusive and mean that there may be additional elements other than the listed elements. Moreover, the use of "top", "bottom", "above", "below" and variations of these terms is made for convenience, but does not require any particular orientation of the components.

While the invention may be susceptible to various modifications and alternative forms, specific embodiments have been shown by way of example in the figures and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A pharmaceutical order filling system comprising:
   an order processing device to receive pharmaceutical orders;
   an automated dispensing device in communication with the order processing device and configured to dispense a measured quantity of a pharmaceutical into at least one container of a plurality of containers;
   a plurality of pallets configured to transport the plurality of containers;
   a container sorting device in communication with the order processing device, the container sorting device configured to transfer the plurality of containers containing the pharmaceuticals from the plurality of pallets to at least one of a plurality of distribution areas, the container sorting device comprising:
   a pallet unloading area sized to retain at least one pallet of the plurality of pallets in a pallet unloading position;
   at least one exception conveyor;
   at least one standard order conveyor;
   a container manipulation device including a gripper assembly for moving at least one of the plurality of containers from at least one of the plurality of pallets to one of the at least one exception conveyor and the at least one standard order conveyor, wherein a first order of the pharmaceutical order includes a first container and a second container of the plurality of containers, wherein the container manipulation device moves the first container to the at least one standard order conveyor and then moves the second container to the at least one standard order conveyor with the first container and the second container being sequential on a same one of the at least one standard order conveyor and being non-sequential on the at least one of the plurality of pallets; and
   a pallet assembly in communication with the order processing device, the pallet assembly comprising a pallet movement apparatus configured to move the plurality of pallets between at least the automated dispensing device and the container sorting device.

2. The pharmaceutical order filling system of claim 1 wherein the at least one exception conveyor includes a first exception conveyor and a second exception conveyor and wherein the gripper assembly of the container manipulation device is configured to move the at least one of the containers to one of the first exception conveyors and the second exception conveyors.

3. The pharmaceutical order filling system of claim 1 wherein the at least one exception conveyor includes a first exception conveyor, a second exception conveyor and a third exception conveyor.

4. The pharmaceutical order filling system of claim 1 wherein the first exception conveyor is configured to receive a second order including only one container.

5. The pharmaceutical order filling system of claim 1 wherein the second exception conveyor is configured to receive one of the plurality of containers requiring further inspection.

6. The pharmaceutical order filling system of claim 1 wherein at least some of the conveyors extend from a controlled access area to a packing device and to an inspection station outside the controlled access area for controlled substances.

7. The pharmaceutical order filling system of claim 1 wherein the container sorting device is at least partially disposed in a controlled access area for controlled substances.

8. The pharmaceutical order filling system of claim 1 wherein the at least one exception conveyor is at least partially disposed in a controlled access area for controlled substances.

9. The pharmaceutical order filling system of claim 1 wherein the system is free of a rotary sortation wheel.

10. The pharmaceutical order filling system of claim 1 further comprising:
    a sensor bracket configured to retain a sensor for determining a status of the at least one pallet; and
    a puck stop rail assembly extending at least partially around the pallet unloading area, the puck stop rail assembly configured to at least partially constrain movement of the at least one pallet in the pallet unloading position during operation of the container sorting device; and
    wherein the gripper assembly comprises:
    at least one gripper head configured to grip and release the at least one container, wherein the at least one gripper head is one of biased open and biased closed, wherein the at least one gripper head is independently and pneumatically actuated and is adapted to grip and to release the at least one container, the at least one gripper head comprising:
    at least one pair of gripper jaws, at least a portion of the at least one pair of gripper jaws including a friction-enhanced surface configured to increase a coefficient of friction between the at least one container and the at least one pair of gripper jaws; and
    at least one gripper head arm coupled between the movement apparatus and the gripper head;
    a pallet lift configured to manipulate the at least one pallet in the pallet unloading position in cooperation with the container manipulation device.

11. The pharmaceutical order filling system of claim 10 further comprising a guard substantially surrounding at least a portion of the container sorting device and defining a workspace, wherein the guard is configured to inhibit an operator from accessing the workspace during operation of the container sorting device, and wherein the guard is at least one of a substantially solid guard and a sensor-based guard configured to halt operation of the container sorting device when an operator is detected in the workspace.

12. The pharmaceutical order filling system of claim 10 wherein the friction-enhanced surface is configured to enhance a coefficient of friction between the containers and the pair of gripper jaws to facilitate retrieval of the containers from within the cavities of the pallet.

13. The pharmaceutical order filling system of claim 10 wherein the gripper head is biased closed, and the gripper head uses spring force to maintain the pair of gripper jaws in a closed position.

14. The pharmaceutical order filling system of claim 10 wherein the gripper head is independently, pneumatically actuated such that activation of a pneumatic pressure sources causes the pair of gripper jaws to move from the closed position to the open position, wherein the open position represents a distance between each gripper jaw of the pair of gripper jaws that is at greater than a diameter of the containers within the pallet.

15. The pharmaceutical order filling system of claim 1 wherein the container manipulation device includes at least one of a collaborative robot, a selective-compliance-articulated robot arm, a six-axis robot, a cylindrical robot, a delta robot, a polar coordinate robot, a vertically articulated robot, and a Cartesian coordinate robot.

16. The pharmaceutical order filling system of claim 1 wherein the container manipulation device is configured to move more than one container during each cycle of the container sorting subsystem.

17. A method of sorting a plurality of containers containing a plurality of pharmaceuticals associated with a plurality of pharmaceutical orders, the method comprising:
 receiving, at a pallet unloading position of a container sorting device, a first pallet of a plurality of the pallets, wherein the pallet includes a plurality of the containers containing the plurality of pharmaceuticals associated with a plurality of pharmaceutical orders;
 determining a location of at least one container of the plurality of containers associated with a first pharmaceutical order in the pallet;
 retrieving, using a container manipulation device, the at least one container associated with the first pharmaceutical order from the pallet;
 determining, based on the first pharmaceutical order, a conveyor of at least one of a standard order conveyor, a first exception conveyor, and a second exception conveyor to receive the at least one container; and
 placing, using the container manipulation device, the at least one container on the determined conveyor for distribution downstream of the container sorting device.

18. The method of claim 17 further includes sorting the plurality of containers and wherein the first pharmaceutical order includes containers in non-sequential position on the first pallet.

19. The method of claim 18 wherein the placing step includes placing each of the containers of a first pharmaceutical order in sequential position on the standard order conveyor.

20. The method of claim 19 wherein the first pharmaceutical order includes containers on a second of the plurality of the pallets, and the retrieving step includes retrieving containers from the first and second pallets and placing the containers in sequential position on one of the conveyors.

21. The method of claim 19 wherein the first pharmaceutical order includes containers on a second of the plurality of the pallets, and the retrieving step includes retrieving containers from the first and second pallets and placing the containers in sequential position on the standard conveyor.

22. The method of claim 17 wherein at least one of the receiving step, retrieving step and the placing step occurs in a controlled access area for controlled substances.

23. The method of claim 17 wherein the method is free of a step of placing the at least one container on a rotary sortation wheel.

* * * * *